(12) United States Patent
Bassett et al.

(10) Patent No.: US 7,581,241 B2
(45) Date of Patent: Aug. 25, 2009

(54) GENERATING AN OUTBOUND CONNECTION SECURITY POLICY BASED ON AN INBOUND CONNECTIONS SECURITY POLICY

(75) Inventors: Charles D. Bassett, Seattle, WA (US); Lokesh Srinivas Koppolu, Redmond, WA (US); Maksim Noy, Kirkland, WA (US); Sarah A. Wahlert, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 11/182,720

(22) Filed: Jul. 15, 2005

(65) Prior Publication Data

US 2007/0016937 A1    Jan. 18, 2007

(51) Int. Cl.
 *H04L 9/00* (2006.01)
(52) U.S. Cl. ............................................ 726/1
(58) Field of Classification Search ........................ None
See application file for complete search history.

(56) References Cited

U.S. PATENT DOCUMENTS

2002/0093915 A1* 7/2002 Larson ........................ 370/235
2003/0041266 A1* 2/2003 Ke et al. ..................... 713/201

OTHER PUBLICATIONS

U.S. Appl. No. 11/183,317, filed Jul. 15, 2005, Bassett et al.

Atkinson, R., RFC 1827, "IP Encapsulating Security Payload (ESP)," Network Working Group, Standards Track, Aug. 1995 (12 pages).
Kanda, Mitsuru, "IPsec: a basis for IPv6 security (Part 1)," IPv6sytle, Jul. 7, 2004 (4 pages) http://www.ipv6style.jp/en/tech/20040707/20040707_p.shtml.
Karve, Anita, "EBN—IP Security," Feb. 1, 1998 (4 pages) http://www.networkmagazine.com/shared/article/showArticle.jhtml?articleId=17600993.
Kent, S., "IP Authentication Header," Internet-Draft, IPsec Working Group, Internet Engineering Task Force, Mar. 2005 (30 pages).
Kent, S. and R. Atkinson, RFC 2406, "IP Encapsulating Security Payload (ESP)," Network Working Group, Standards Track, The Internet Society, Nov. 1998 ( 22 pages).
Kent, S. and R. Atkinson, RFC 2402, "IP Authentication Header," Network Working Group, Standards Track, The Internet Society, Nov. 1998 (22 pages).
Maughan, D., M. Schertler, M. Schneider and J. Turner, RFC 2408, "Internet Security Association and Key Management Protocol (ISAKMP)," Network Working Group, Standards Track, The Internet Society, Nov. 1998 (86 pages).
Perlman, Radia, "Understanding IKEv2: Tutorial, and rationale for decisions," IPSEC Working Group Internet-DRAFT, Feb. 2003 (14 pages).

(Continued)

*Primary Examiner*—Brandon S Hoffman
(74) *Attorney, Agent, or Firm*—Perkins Coie LLP

(57) ABSTRACT

A security system that allows an outbound security policy for the connection security to be automatically derived from an inbound security policy for connection security is provided. The security system for an inbound security policy has security suites that each specify one or more security algorithms. Because the security system offers an outbound security suite that matches an inbound security suite, the computing devices that have the same inbound security policy have matching inbound and outbound security suites.

20 Claims, 25 Drawing Sheets

OTHER PUBLICATIONS

Piper, D., RFC 2407, "The Internet IP Security Domain of Interpretation for ISAKMP," Network Working Group, Standards Track, The Internet Society, Nov. 1998 (32 pages).

McDonald, D., C. Metz and B. Phan, RFC 2367, "PF_KEY Key Management API, Version 2," Network Working Group, Informational, The Internet Society, Jul. 1998 (68 pages).

Lavigne, Dru, "Cryptosystems: Configuring IPSec," O'Reilly, ONLamp.com, Dec. 26, 2002 (10 pages) http://www.onlamp.com/pub/a/bsd/2002/12/26/FreeBSD_Basics.html.

Kent, S. and R. Atkinson, RFC 2401, "Security Architecture for the Internet Protocol," Network Working Group, Standards Track, The Internet Society, Nov. 1998 (66 pages).

Kent, S., "IP Encapsulating Security Payload (ESP)," Internet-Draft, IPsec Working Group, Internet Engineering Task Force, Mar. 2005 (40 pages).

Kaufman, Charlie, "Internet Key Exchange (IKEv2) Protocol," Internet-Draft, Internet Engineering Task Force, The Internet Society, Sep. 23, 2004 (99 pages).

Kanda, Mitsuru, "IPsec: a basis for IPv6 security (Part 2)," IPv6style, Jul. 22, 2004 (3 pages) http://www.ipv6style.jp/en/tech/20040722/20040722_p.shtml.

Harkins, D. and D. Carrel, RFC 2409, "The Internet Key Exchange (IKE)," Network Working Group, Standards Track, The Internet Society, Nov. 1998 (41 pages).

Atkinson, R., "RFC 1826—IP Authentication Header," Network Working Group, Standards Track, Aug. 1995 (13 pages).

Allard, Johan and Svante Nygren, "EBN—IPsec," Jun. 1, 1999 (5 pages) http://www.networkmagazine.com/shared/article/showArticle.jhtml?.

* cited by examiner

GENERATING AN OUTBOUND CONNECTION SECURITY POLICY BASED ON AN INBOUND CONNECTIONS SECURITY POLICY

BACKGROUND

Computing devices are being used to store and transmit vast amounts of sensitive data. Computing devices that are connected to the Internet or other networks (e.g., cellular phone networks) are under constant attack by hackers seeking to obtain or destroy such sensitive data. To ensure the privacy of the sensitive data during both storage and transmission, many different security tools have been implemented to secure such sensitive data. The security tools include application level firewall tools and Internet Protocol ("IP") security tools. An application level firewall allows restrictions to be placed on the source and destination of data that is transmitted between applications executing on different computing devices. For example, an application level firewall may prevent a computing device that is not authorized to send data to a protected computing device from doing so. The firewall may intercept all data that is sent to the protected computing device and discard the data when it is not from a computing device with an authorized IP address. An application level firewall may also restrict access based on port number associated with an application. The restricting of the users and the computing devices from which a protected computing device can receive data can help prevent malicious attacks by malware that seeks to exploit a vulnerability of a computing device. Such malware may include rootkits, Trojan horses, keystroke loggers, and so on.

IP security tools seek to ensure the identity of computing devices receiving or transmitting data and the privacy of the data while in transit. Authentication is a process to help ensure the identity of a computing device, and encryption and integrity protection are processes to help ensure the privacy and integrity of data. IP security tools typically implement the IPsec protocols as defined by RFC 1826 of the Internet Engineering Task Force ("IETF") entitled "IP Authentication Header (AH)" and by RFC 1827 of the IETF entitled "IP Encapsulating Security Payload (ESP)." The AH protocol is used to provide security services such as connectionless integrity and data origin authentication of IP data. The security services can be provided between a pair of communicating hosts, between a pair of communicating security gateways, or between a security gateway and a host. The ESP protocol is designed to provide a mix of security services alone or in combination with the AH protocol. The ESP protocol can be used to provide confidentiality, data origin authentication, and connectionless integrity. The AH and ESP protocols allow data to be transmitted securely between computing devices. The IPsec protocols may use RFC 2409 of the IETF entitled "Internet Key Exchange Protocol" to exchange keys between a pair of communicating devices.

Although tools that implement firewalls and IPsec can help ensure data security of the sensitive data, the configuring of firewalls and IPsec tools can be both difficult and tedious. Typically, such configuration is performed by security personnel of the enterprise who seek to establish a security policy for the enterprise. Security policy may use firewall rules and IPsec or connection rules to define how computing devices of the enterprise communicate with other computing devices both internal and external to the enterprise. Security personnel typically use a firewall tool to define the firewall rules and use an IPsec tool to define the IPsec rules. Security personnel need to coordinate the firewall rules and the IPsec rules to ensure that they are consistent and correctly implement the desired security policy of the enterprise. It can be particularly difficult for security personnel to configure an IPsec tool to implement a security policy because of the complexity of IPsec, because Ipsec terminology can be confusing and inconsistent, and because many decisions need to be made by security personnel. Moreover, because firewall and IPsec are overlapping technologies, it is easy for security personnel to be confused over how to implement an enterprise security policy. As a result, the implementations of security policies of many enterprises may not provide the desired level of security, which leaves the computing devices of the enterprise vulnerable to attack.

IPsec security policies are further difficult to implement because they require that the outbound security policy of an outbound device be symmetric with the inbound security policy of an inbound device. In particular, a rule and crypto suite of security algorithms of an outbound security policy needs to match a rule and a crypto suite of security algorithms of an inbound security policy. Since selecting of security algorithms for security policies can be both tedious and complex, it can be difficult for administrators to establish matching inbound and outbound security policies.

SUMMARY

A security system that allows an outbound security policy for the connection security to be automatically derived from an inbound security policy for connection security is provided. The security system for an inbound security policy has security suites that each specifies one or more security algorithms. Once the inbound security policy is distributed to the computing devices of an enterprise, the security system can use the security suites of the inbound security policy as the basis of the security suites for the outbound security policy of the computing devices. Because each computing device offers an outbound security suite that matches the same inbound security suite that is distributed to the computing devices of an enterprise, those computing devices have matching inbound and outbound security suites.

A method and system for creating security policies for firewall and connection policies in an integrated manner is provided. The security system provides a user interface through which a user can define a security rule that specifies both a firewall policy and a connection policy. After the security rule is specified, the security system automatically generates a firewall rule and/or a connection rule to implement the security rule. The security system provides the firewall rule to a firewall engine that is responsible for enforcing the firewall rules and provides the connection rule to an IPsec engine that is responsible for enforcing the connection rules. The security system ensures that the firewall rules and the connection rules are consistent. The security system can also generate firewall rules with knowledge of connection rules because the security rule specifies connection security.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
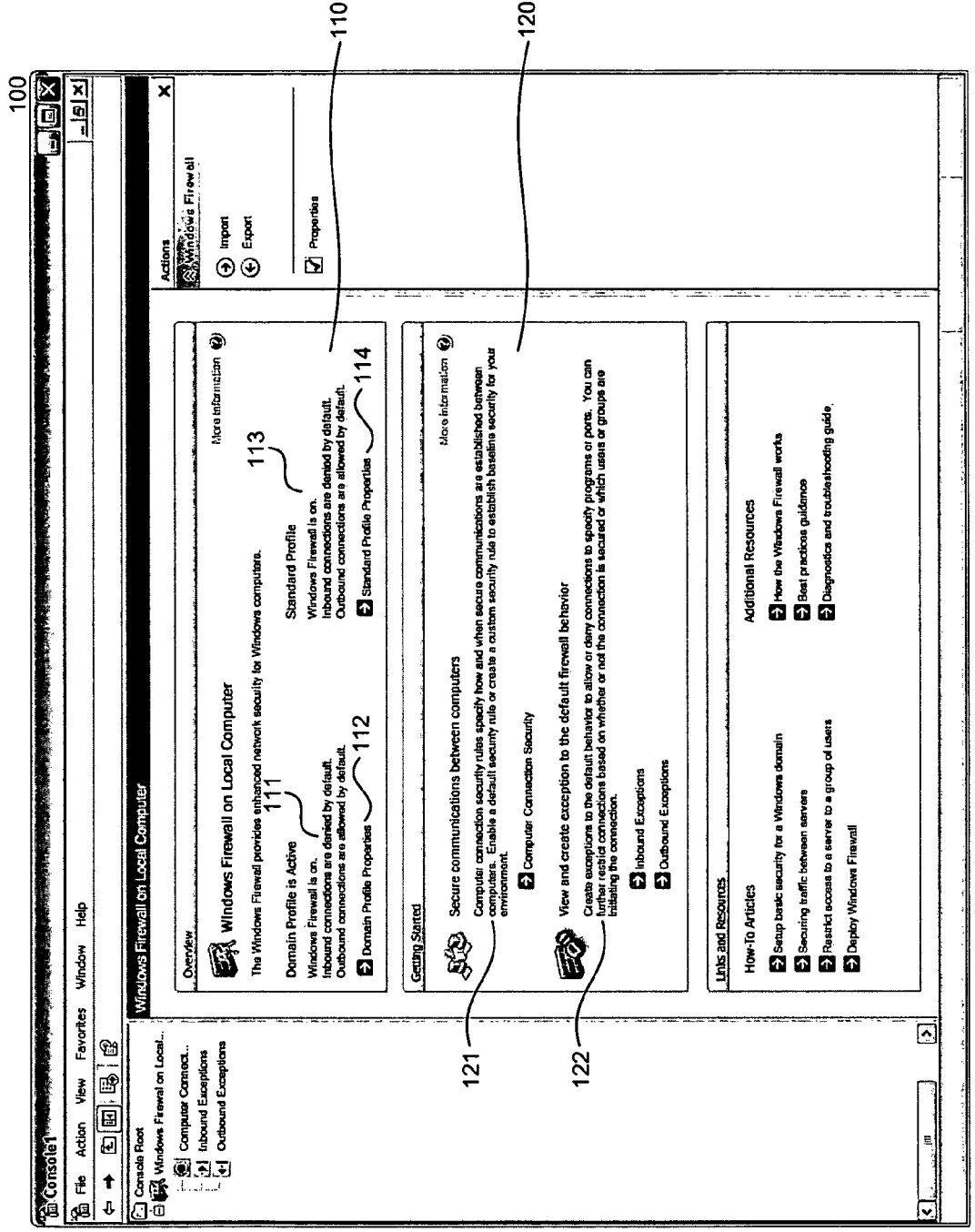
FIG. 1 is an overview display page in one embodiment.

A method and system for creating security policies for firewall and connection policies in an integrated manner is provided. In one embodiment, the security system provides a user interface through which a user can define a security rule that specifies a firewall policy and/or a connection policy. For example, the security rule may specify a port through which inbound traffic may be received from a certain computing device and further specifies that traffic received through that port should be encrypted. After the security rule is specified, the security system automatically generates a firewall rule, a connection rule, or a combination of one or more firewall rules and connection rules to implement the security rule. For example, the firewall rule restricts inbound traffic on that port to a computing device with a specified IP address, and the connection rule specifies that inbound traffic to that port and from the specified IP address is to be encrypted. The security system provides the firewall rule to a firewall engine that is responsible for enforcing the firewall rules and provides the connection rule to an IPsec engine that is responsible for enforcing the connection rules. Because the security system automatically generates both the firewall rules and the connection rules that form a higher-level security rule, it can ensure that the firewall rules and the connection rules are consistent. Moreover, since the security system generates firewall rules with knowledge of connection rules, the firewall rules can be based on information that is not normally available to a firewall. In this way, an administrator can rely on the security system to establish consistent firewall rules and connection rules that implement the security policy of an enterprise as expressed by high-level security rules.

In one embodiment, the security system allows a user to establish security rules, also referred to as authenticated firewall rules, that each define a firewall action, conditions under which the action is to be taken, and connection security. The conditions may specify a direction of traffic, the identity of the local application or local service, and a local and a remote address and port, protocol, users and user groups, computers and computer groups, interface types (e.g., wireless LAN), and so on. For example, an authenticated firewall rule may have conditions that specify a local application and remote IP address and port of a computing device. When data directed to that application is received from a computing device with that IP address and port, the conditions of the rule are satisfied and the action of the rule is taken. For example, the action may be to allow the data to be sent to the application or to block the data from being sent to the application. The connection security of the authenticated firewall rule may indicate that the traffic from that remote IP address and port sent to the local application is to be encrypted and have its integrity protected. The security system generates connection security rules to implement the connection security of an authenticated firewall rule. In one embodiment, the security system generates connection security rules from the authenticated firewall rules, but uses the authenticated firewall rules directly as firewall rules. Thus, the term "authenticated" in "authenticated firewall rules" indicates that firewall rules have been augmented with connection security information from which the security system can generate connection security rules (e.g., IPsec rules).

In one embodiment, the security system may provide a default security suite for use in automatically generating connection security rules. The security system may provide default security suites for both the main mode ("phase I") and the quick mode ("phase II") of the IPsec protocol, and for key exchange with the IPsec protocol. A security suite specifies a set of security algorithms to be used by the IPsec protocol. As used herein, a data protection crypto suite may indicate that the ESP protocol is to use SHA-256 for integrity protection and 3DES for encryption. A data protection crypto set may include multiple crypto suites of integrity algorithms and encryption algorithms along with a priority so that an IPsec engine can negotiate which crypto suite to use when communicating with another computing device. Because the security system provides these default security suites, an administrator can specify a security policy that includes connection security rules without having to specify integrity protection algorithms and encryption algorithms. An authentication set of the main mode may specify authentication methods (e.g., Kerberos). A key exchange crypto suite of the main mode may specify a key exchange algorithm (e.g., DH1), an encryption algorithm (e.g., 3DES), and an integrity protection algorithm (e.g., SHA1). An authentication set of the quick mode may specify an authentication method and authentication data. A data protection crypto suite of the quick mode may specify a protocol (e.g., ESP), an encryption algorithm (e.g., 3DES), and an integrity protection algorithm (e.g., SHA1). The security system may allow a user to define additional security suites.

In one embodiment, the security system allows an outbound security policy for connection security to be automatically derived from an inbound security policy for the connection security. The security system for an inbound security policy has security suites that each specifies one or more security algorithms. Once the inbound security policy is distributed to the computing devices of an enterprise, the security system can use the security suites of the inbound security policy as the basis of the security suites for the outbound security policy of the computing devices. For example, the inbound security policy may specify a main mode key exchange crypto suite for IPsec with an integrity algorithm of SHA1, an encryption algorithm of 3DES, and a key exchange algorithm of Diffie-Hellman Group 2. If so, then the security system may offer the same security suite when negotiating an outbound connection. Because each computing device offers an outbound security suite that matches an inbound security suite, the computing devices by definition have matching inbound and outbound security suites. In this way, the computing devices of an enterprise can establish secure connections based on automatically generated outbound security policies. In an alternate embodiment, the security system may automatically generate inbound security policies based on security suites of an outbound security policy. In addition, the security system may automatically augment inbound security policies based on security suites defined for an outbound security policy and augment inbound security policies based on security suites defined for an inbound security policy.

In one embodiment, the security system may provide a security policy for a connection security that is based on default security suites. The security system may define a default security suite for a connection security. For example, a default data protection crypto suite may specify the ESP protocol and include an integrity algorithm of SHA1, and another default data protection crypto suite may specify the ESP protocol and include an integrity algorithm of SHA1 and an encryption algorithm of 3DES. The security system may provide a user interface through which an administrator can select whether the ESP protocol should be based solely on integrity checking or based both on integrity checking and encryption. Based on the selection by an administrator, the security system will automatically use the associated default data protection crypto suite.

FIGS. 1-14 are display pages that illustrate the user interface of the security system in one embodiment. FIG. 1 is an overview display page in one embodiment. Display page 100 includes an overview area 110 provides an overview of current policy defaults and a security policy area 120 provides an introduction to concepts used in the user interface. The overview area includes a domain profile area 111 and a standard profile area 113. The profile areas indicate default policies that that security system implements when generating authenticated firewall rules. The domain profile area specifies a default policy that applies when the computing device is connected to a domain of which it is a member (e.g., LAN of an enterprise), and the standard profile area specifies a default policy that applies when the computing device is not connected to a domain of which it is a member (e.g., via a publicly accessible Internet access point). In this example, the domain profile area indicates that the firewall is enabled, inbound connections are denied or blocked by default, and outbound connections are allowed by default. The domain profile properties button 112 and the standard profile properties button 114 provide access to display pages for modifying the default profile behavior. The security policy area includes a connection security area 121 and a firewall security area 122. The connection security area allows a user to define security suites for use in generating the connection security rules and to create custom connection security rules. The firewall security area allows the user to define authenticated firewall rules, which specify exceptions to the default policies as specified in the domain profile area or standard profile area.

Figure 2:
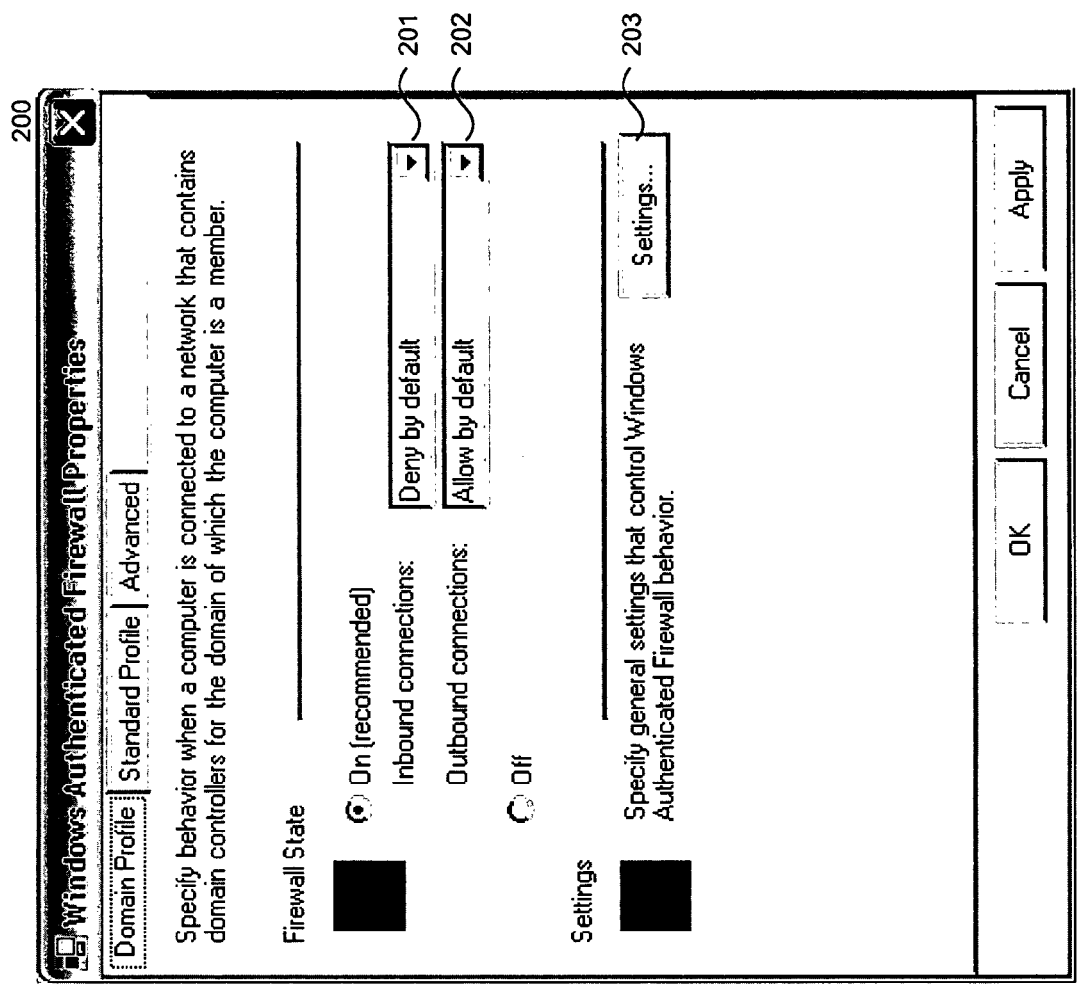
FIG. 2 is a display page that illustrates the establishing of a default policy for the domain profile in one embodiment.

FIG. 2 is a display page that illustrates the establishing of a default policy for the domain profile in one embodiment. Display page 200 includes an inbound connections box 201, an outbound connections box 202, and a settings button 203. The inbound connections box allows the user to establish a default policy of allowing or denying inbound connections. The outbound connections box allows the user to establish a default policy of allowing or denying outbound connections. The settings button allows the user to specify general behavior of the firewall tool such as notifying a user when a program is blocked from accepting inbound connections, allowing a local administrator to create exceptions, and so on.

Figure 3:
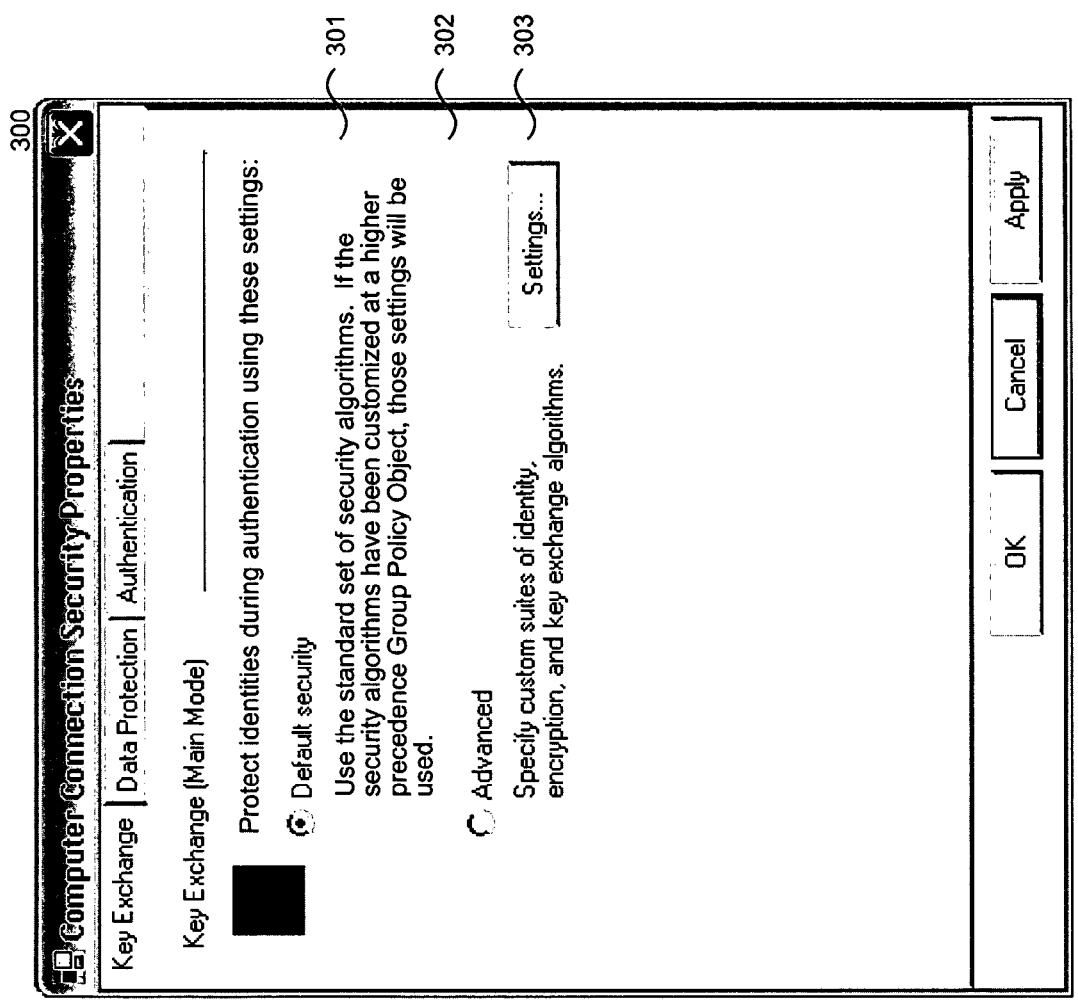
FIG. 3 is a display page that illustrates the establishing of crypto suites for key exchange in one embodiment.

FIG. 3 is a display page that illustrates the establishing of crypto suites for key exchange in one embodiment. Display page 300 includes radio buttons 301 and 302 and settings button 303 for controlling the exchange of keys during the main mode of IPsec. The radio buttons allow the user to select a standard set of crypto suites that may be defined hierarchically by groups within an enterprise or to specify custom security suites for key exchange. In general, the security policy, such as authenticated firewall rules and security suites, may be defined at various group levels within an enterprise. For example, the entire enterprise may be the highest-level group and various divisions may be lower-level groups. The enterprise security policies may specify the minimum security policy for all computing devices of the enterprise. A division security policy may be a more restrictive policy, for example, because of the highly sensitive nature of the data handled by the computing devices of that division. The security system may establish that the default security policy for a computing device is a combination of the security policies of all the groups to which it hierarchically belongs. The settings button allows a user to customize the default security policy.

Figure 4:
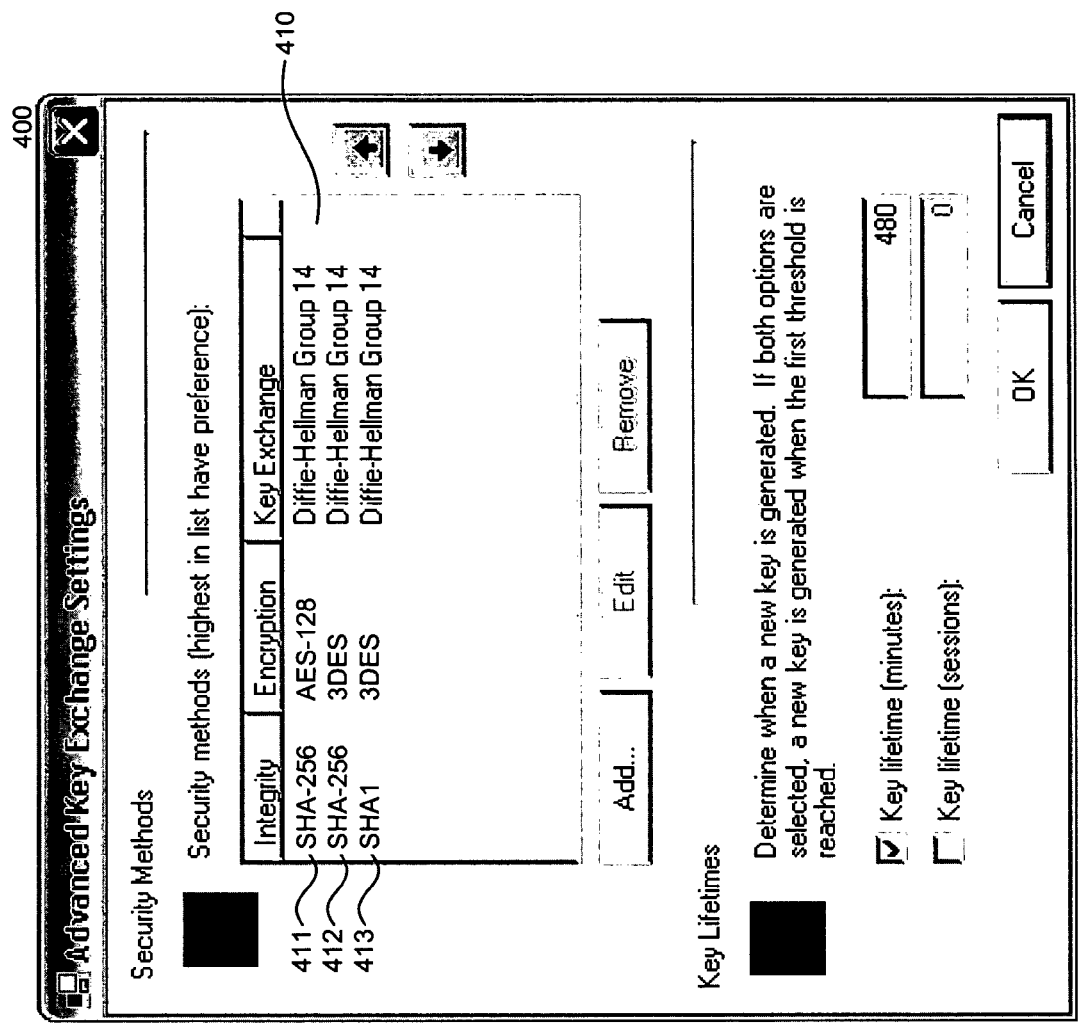
FIG. 4 is a display page that illustrates the setting of security algorithms for key exchange crypto suites in one embodiment.

FIG. 4 is a display page that illustrates the setting of security algorithms for key exchange crypto suites in one embodiment. Display page 400 includes crypto suite definition area 410 that defines three crypto suites 411-413. Each crypto suite specifies an integrity algorithm, encryption algorithm, and key exchange algorithm. The ordering of the key exchange crypto suites indicates the preference used by the security system in negotiating which key exchange suite to use.

Figure 5:
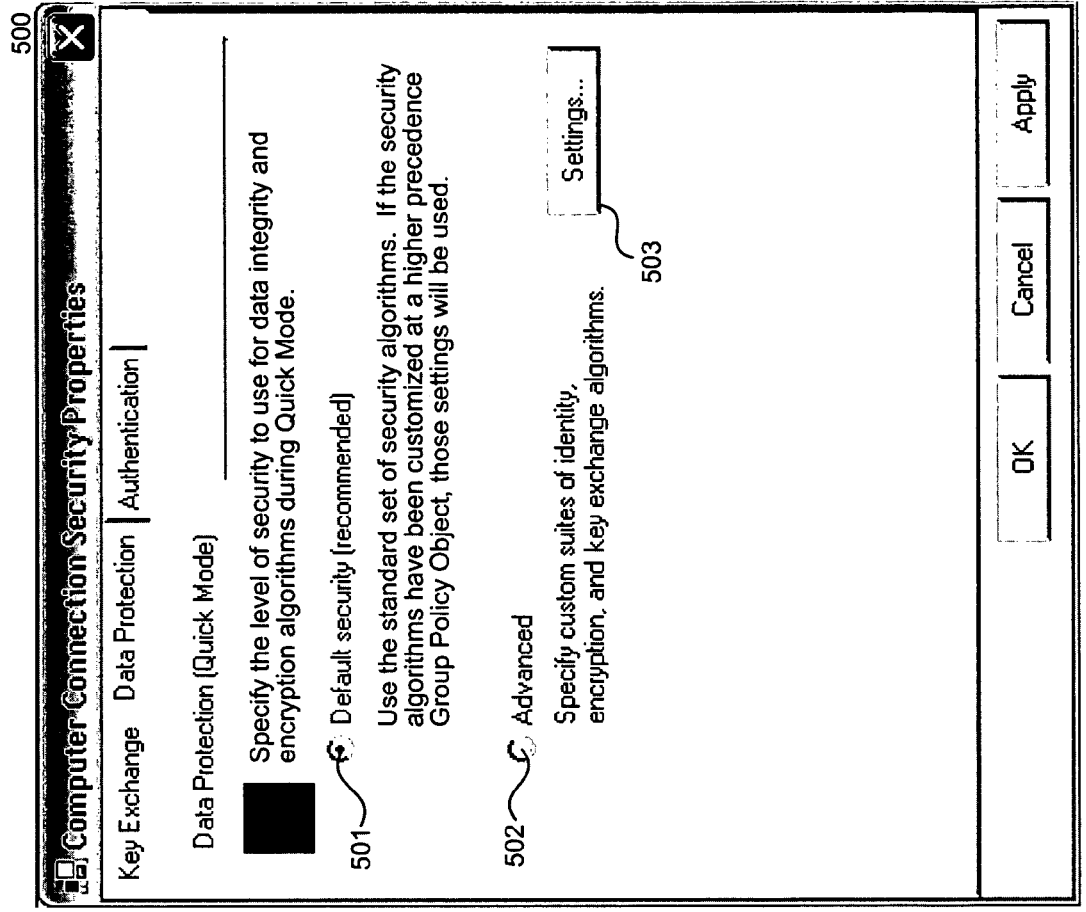
FIG. 5 is a display page that illustrates the setting of crypto suites for data protection in one embodiment.

FIG. 5 is a display page that illustrates the setting of crypto suites for data protection in one embodiment. Data protection security includes both integrity protection and encryption. Display page 500 includes radio buttons 501 and 502 and settings button 503 for managing data protection security. The radio buttons allow the user to select and use standard crypto suites or to specify custom crypto suites for data protection. The settings button allows a user to specify a custom crypto suite for data protection.

Figure 6:
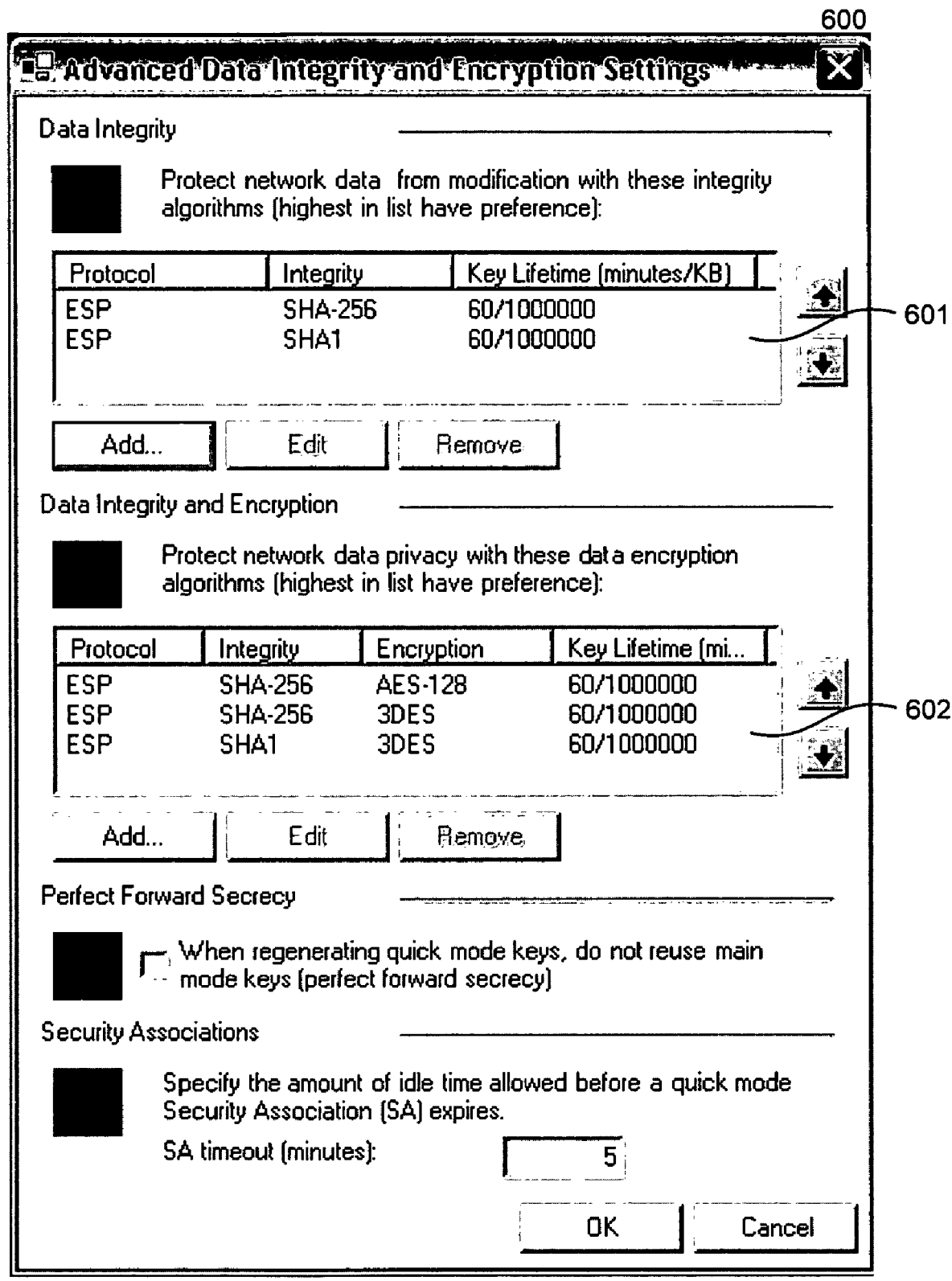
FIG. 6 is a display page that illustrates the setting of security algorithms for data protection crypto suites in one embodiment.

FIG. 6 is a display page that illustrates the setting of security algorithms for crypto suites for data protection in one embodiment. Display page 600 includes a data integrity area 601 and a data integrity and encryption area 602. The data integrity area specifies crypto suites for data integrity only. Each crypto suite specifies the protocol and the integrity algorithm. The data integrity and encryption area specifies crypto suites for data integrity and encryption. Each crypto suite specifies a protocol, integrity algorithm, and encryption algorithm.

Figure 7:
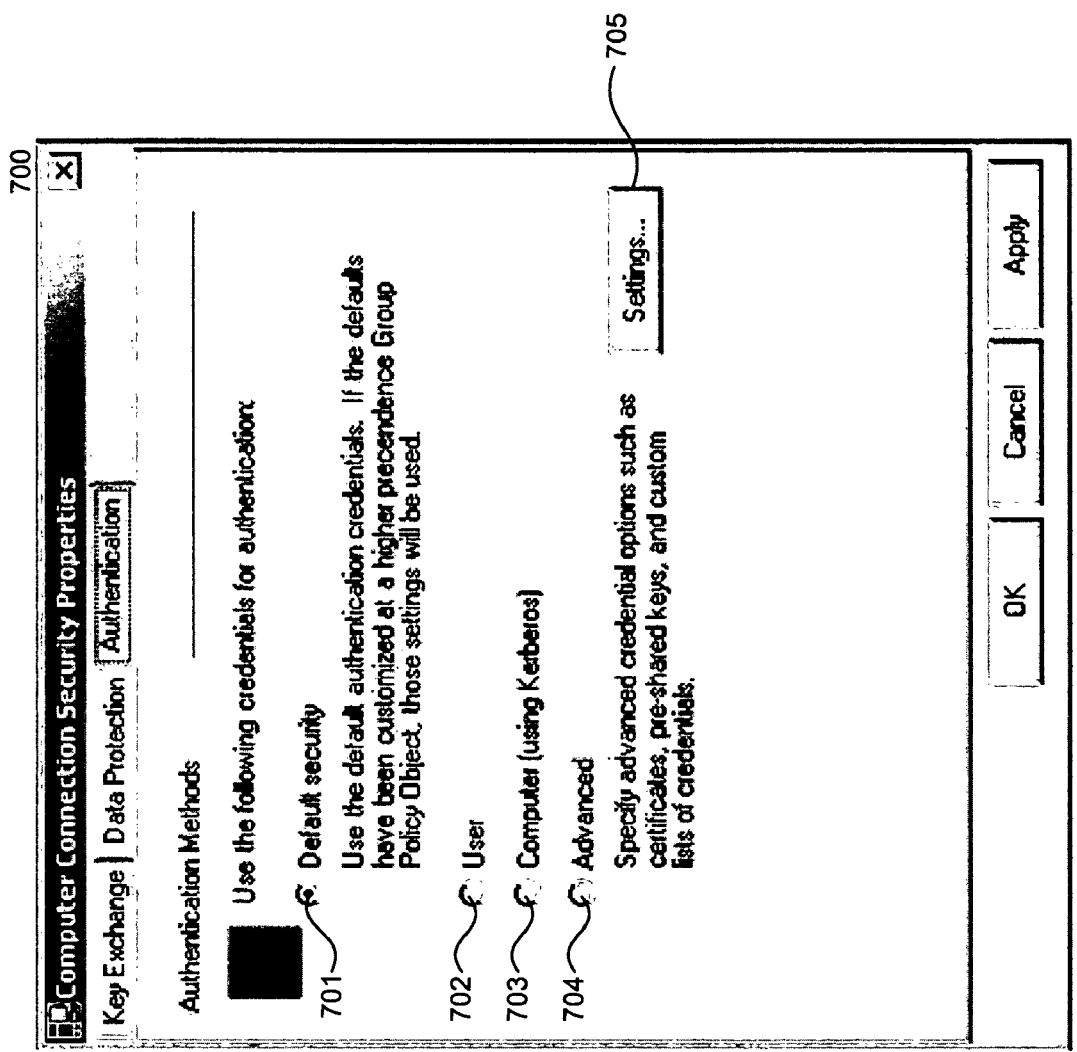
FIG. 7 is a display page that illustrates the setting of authentication methods in one embodiment.

FIG. 7 is a display page that illustrates the setting of authentication methods in one embodiment. Display page 700 includes radio buttons 701-704 and settings button 705. The radio button 701 allows a user to select the default authentication method, which may be based on a hierarchy of authentication methods. Radio buttons 702-704 allow a user to select alternate default authentication methods. The settings button allows a user to specify custom authentication methods.

Figure 8:
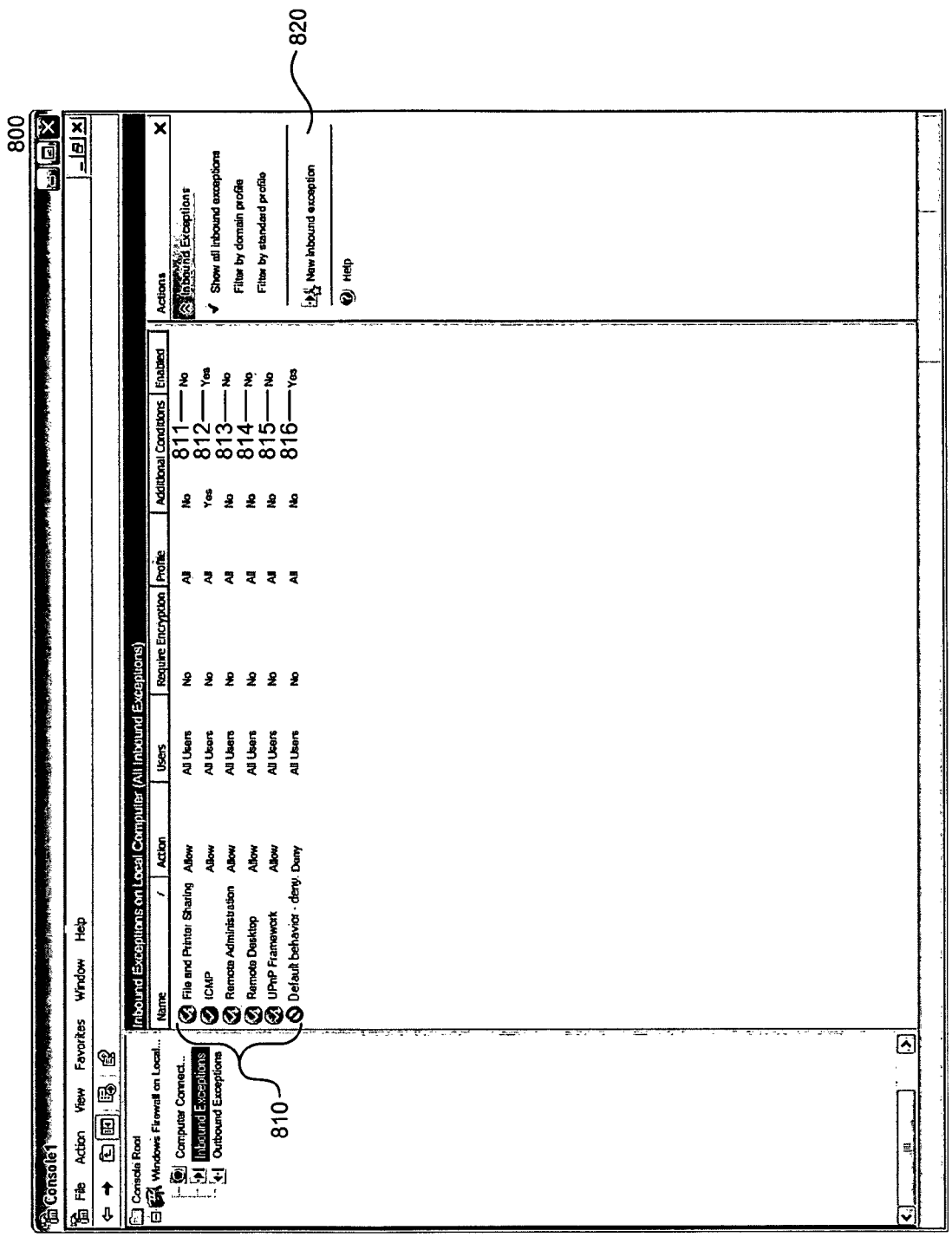
FIG. 8 is a display page that illustrates inbound exceptions to the default security policy in one embodiment.

FIG. 8 is a display page that illustrates inbound exceptions to the default security policy in one embodiment. Display page 800 includes inbound exception area 810 and new inbound exception button 820. The inbound exception area lists inbound exceptions 811-816 to the default security policy. Each inbound exception includes a name, an action, a users, a required encryption, a profile, an additional conditions, an enable, and other fields, which are not shown in this example, that describe the inbound exception. A user uses the new inbound exception button to define or modify an inbound exception. A user modifies an inbound exception by selecting the inbound and then a properties option.

Figure 9:
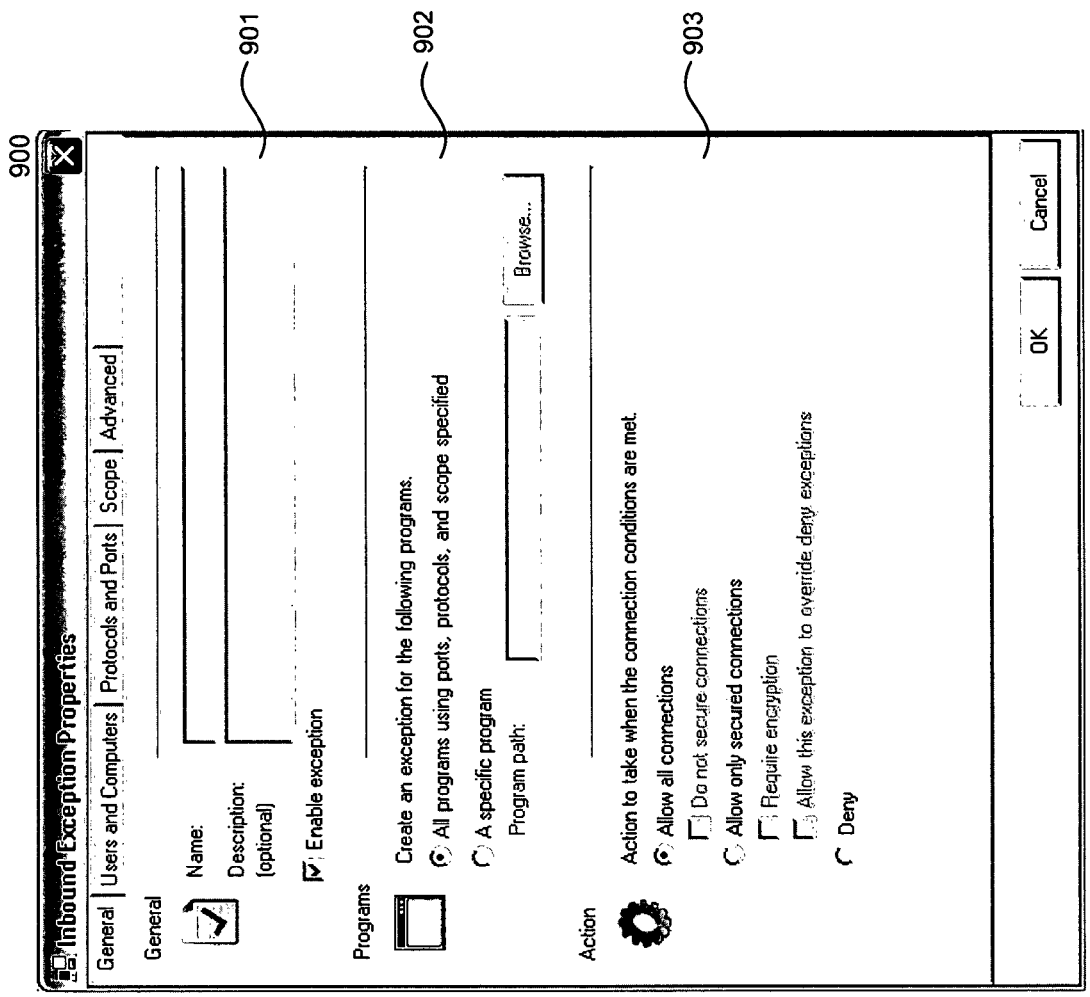
FIG. 9 is a display page that illustrates the setting of general properties for inbound exceptions in one embodiment.

FIGS. 9-13 are display pages that illustrate the defining of inbound exceptions in one embodiment. FIG. 9 is a display page that illustrates the setting of general properties for inbound exceptions in one embodiment. Display page 900 includes a name area 901, a programs area 902, and an action area 903. A user enters the name of the inbound exception in the name area and indicates whether the inbound exception is enabled. A user uses the programs area to specify whether the inbound exception applies to all programs or to a subset of programs as a condition of the authenticated firewall rule. A user uses the action area to specify the action to take when the conditions of the inbound exception are satisfied. The actions include to allow all connections, to allow only secured connections, and to deny connections. When the user indicates to allow only secure connections, then the security system sets an auto-generation flag of the authenticated firewall rule so that the corresponding connection security rule can be automatically generated.

Figure 10:
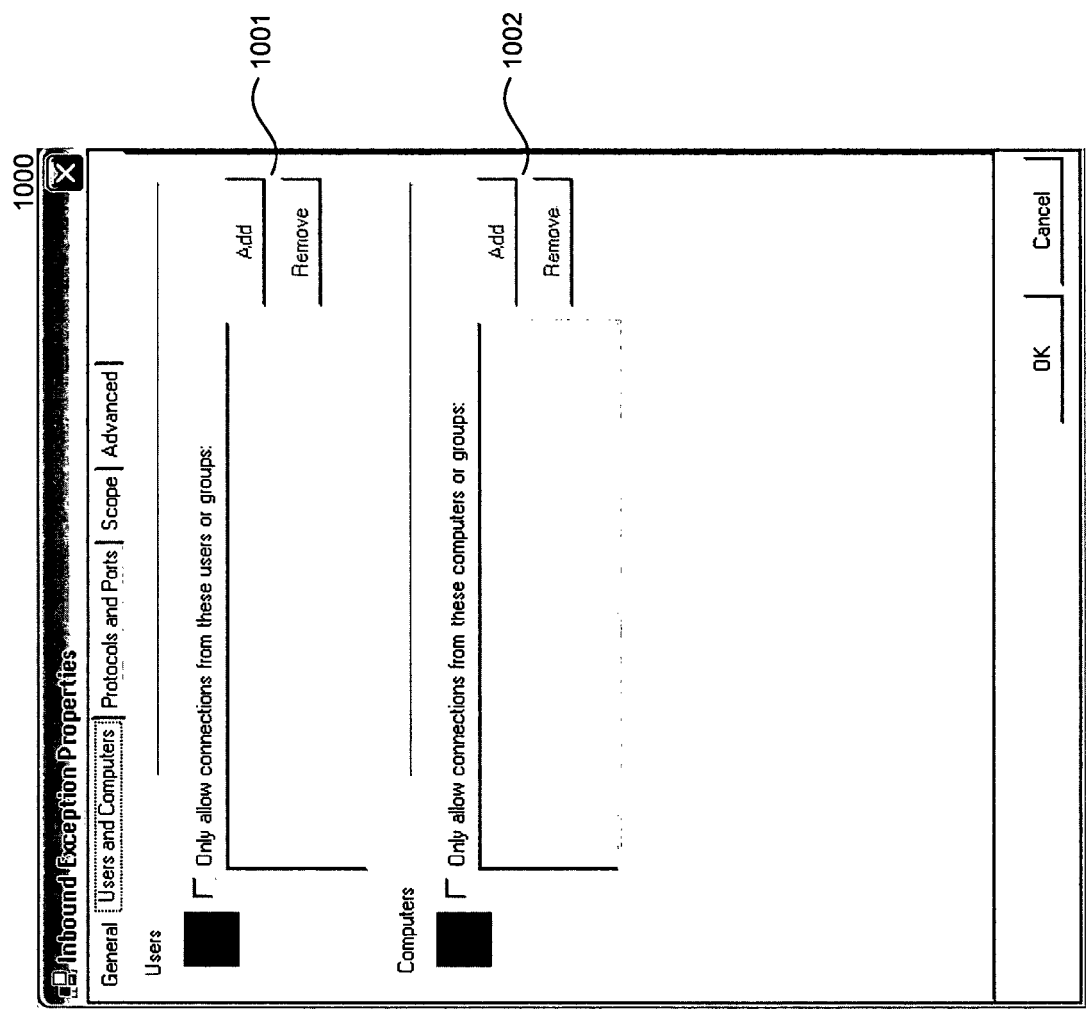
FIG. 10 is a display page that illustrates the setting of users and computers properties for inbound exceptions in one embodiment.

FIG. 10 is a display page that illustrates the setting of users and computers properties for inbound exceptions in one embodiment. Display page 1000 includes a users area 1001 and a computers area 1002. A user enters the names of users or computers, individually or as a group, as a condition of the authenticated firewall rule to restrict the users or computers to which the inbound exception applies.

Figure 11:
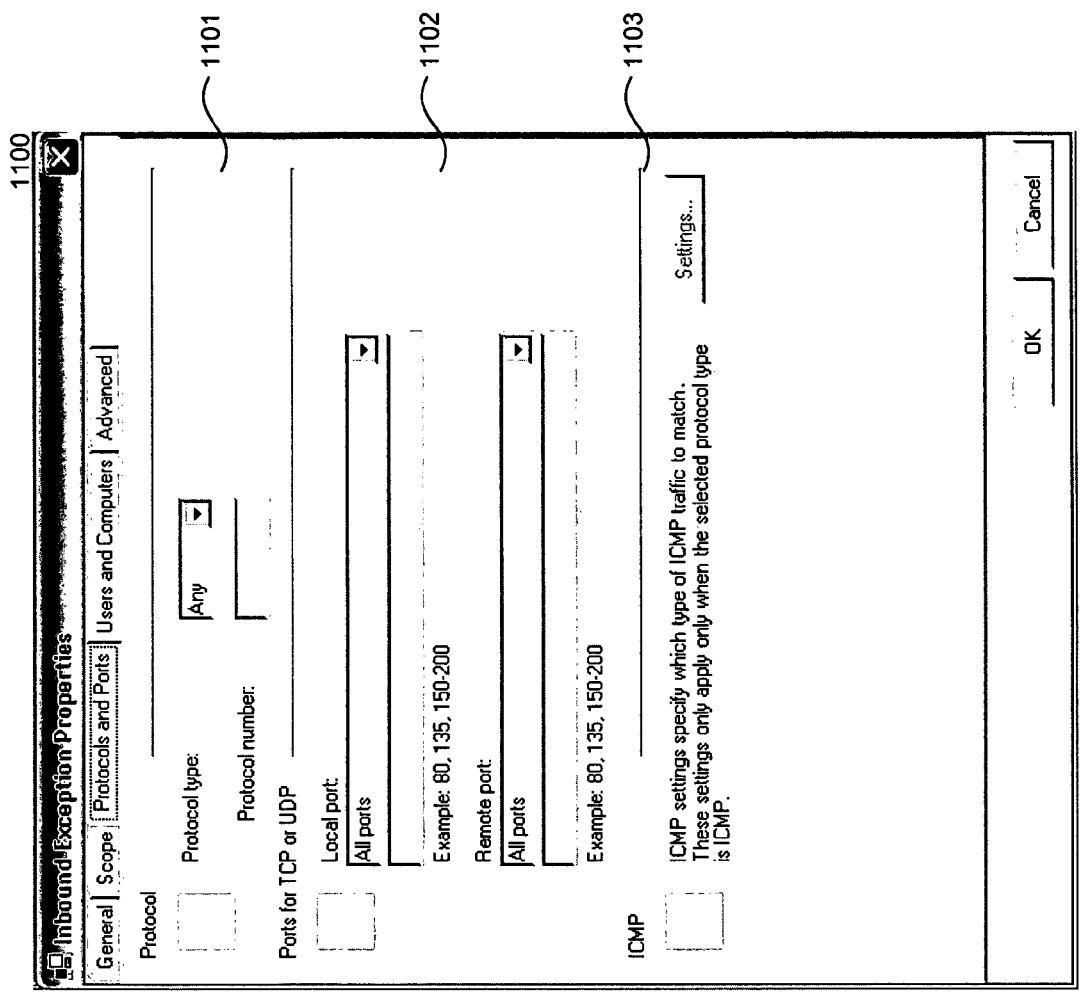
FIG. 11 is a display page that illustrates the setting of protocols and ports for inbound exceptions in one embodiment.

FIG. 11 is a display page that illustrates the setting of protocols and ports for inbound exceptions in one embodiment. Display page 1100 includes a protocol area 1101, a ports area 1102, and an ICMP area 1103. The protocol area allows a user to specify the protocol as a condition of the authenticated firewall rule to which the inbound exception applies. The port area indicates the local and remote ports as a condition of the authenticated firewall rule to which the inbound exception applies if the protocol is TCP or UDP. The ICMP area allows the user to specify Internet Control Management Protocol parameters as a condition of the authenticated firewall rule when the ICMP protocol is specified.

Figure 12:
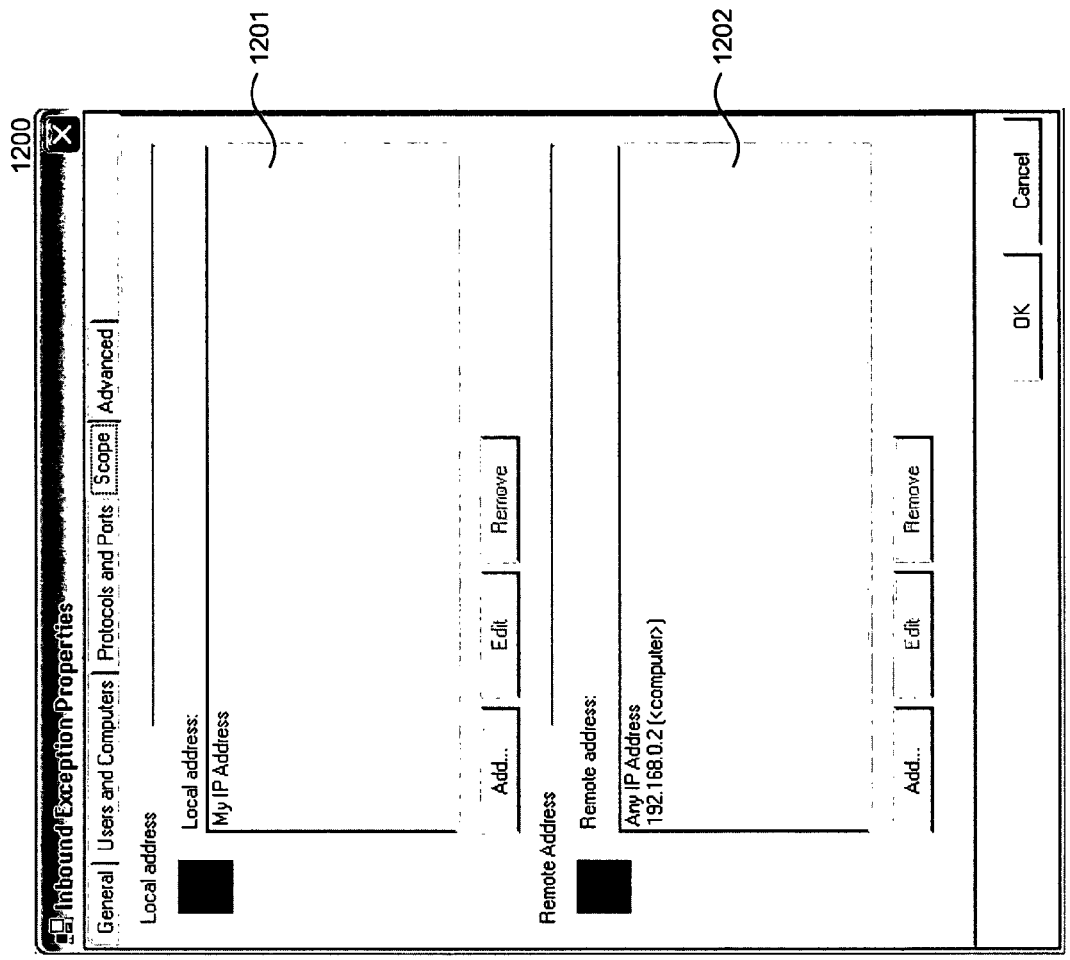
FIG. 12 is a display page that illustrates the setting of the address scope to which an inbound exception applies in one embodiment.

FIG. 12 is a display page that illustrates the setting of the address scope to which an inbound exception applies in one embodiment. Display page 1200 includes a local address area 1201 and a remote address area 1202. The local address area and remote address area allow the user to specify the local and remote addresses as conditions of the authenticated firewall rule to which the inbound exception applies.

Figure 13:
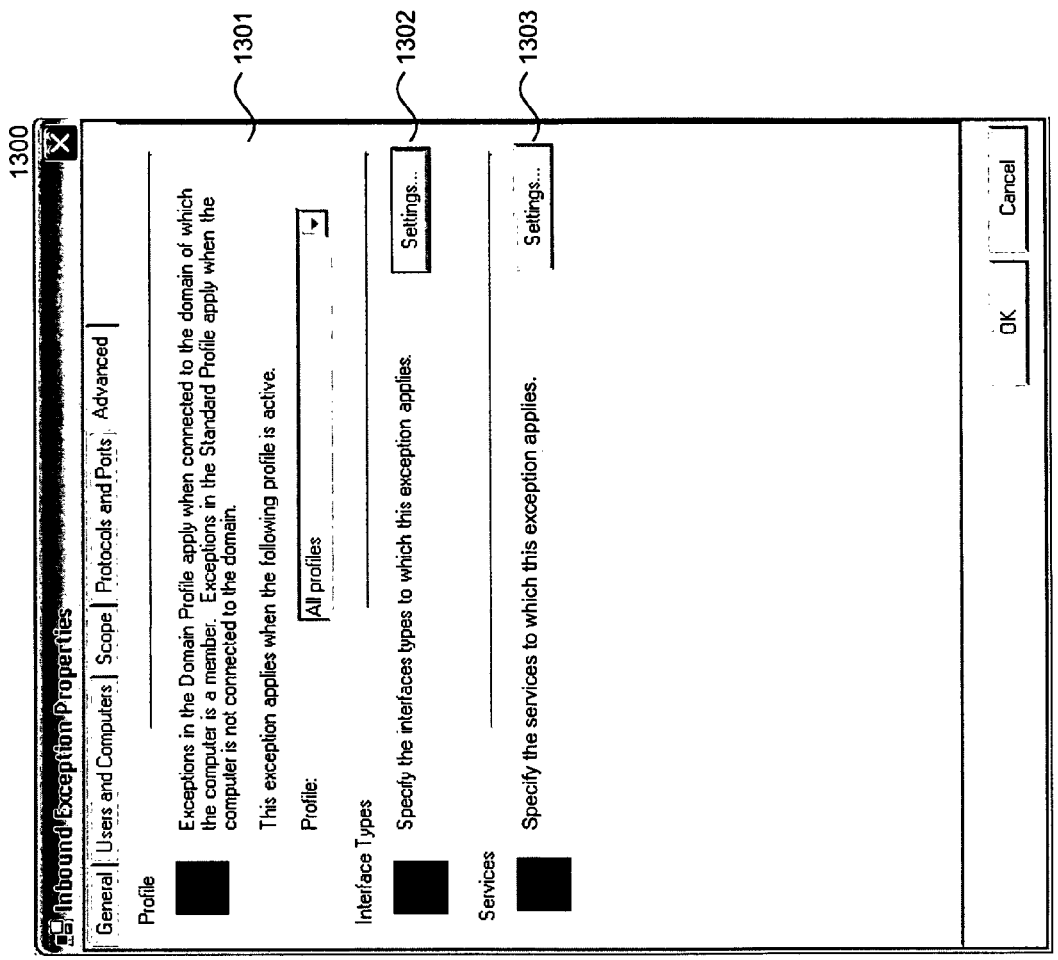
FIG. 13 is a display page that illustrates the setting of advanced attributes of an inbound exception in one environment.

FIG. 13 is a display page that illustrates the setting of advanced attributes of an inbound exception in one environment. Display page 1300 includes a profile area 1301, an interface types button 1302, and a services button 1303. The profile area allows a user to specify to which profiles (i.e., domain and/or standard) as a condition of the authenticated firewall rule the inbound exception applies. The interface types button allows a user to specify the types of interfaces as a condition of the authenticated firewall rule to which the inbound exception applies. The services button allows the user to specify the services as a condition of the authenticated firewall rule to which the inbound exception applies.

Figure 14:
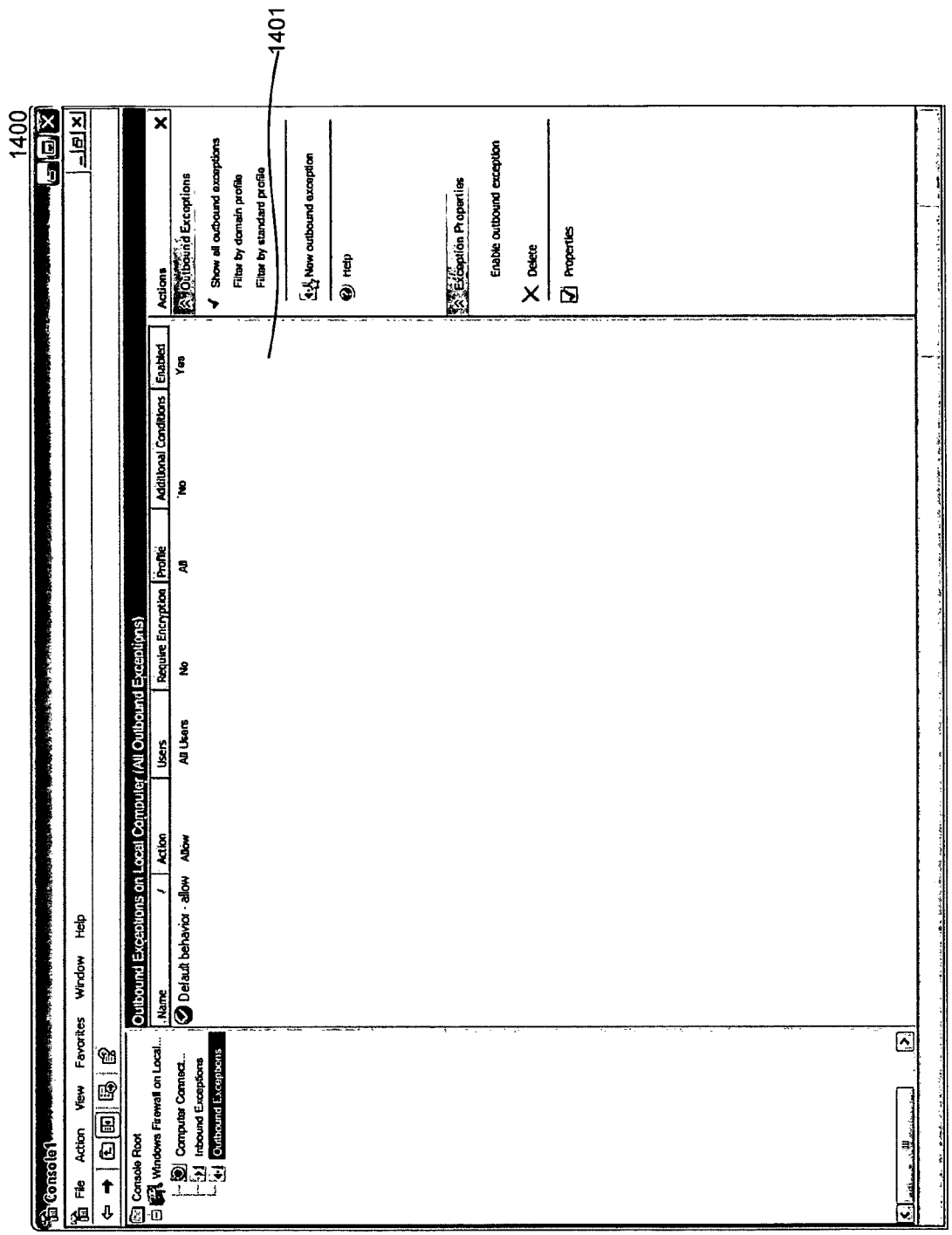
FIG. 14 is a display page that illustrates the outbound exceptions to the profiles in one embodiment.

FIG. 14 is a display page that illustrates the outbound exceptions to the profiles in one embodiment. Display page 1400 includes an outbound exception list area 1401 that lists the outbound exceptions. The security system provides a user interface that allows a user to create and modify outbound exceptions in much the same way as inbound exceptions are modified.

Figure 15:
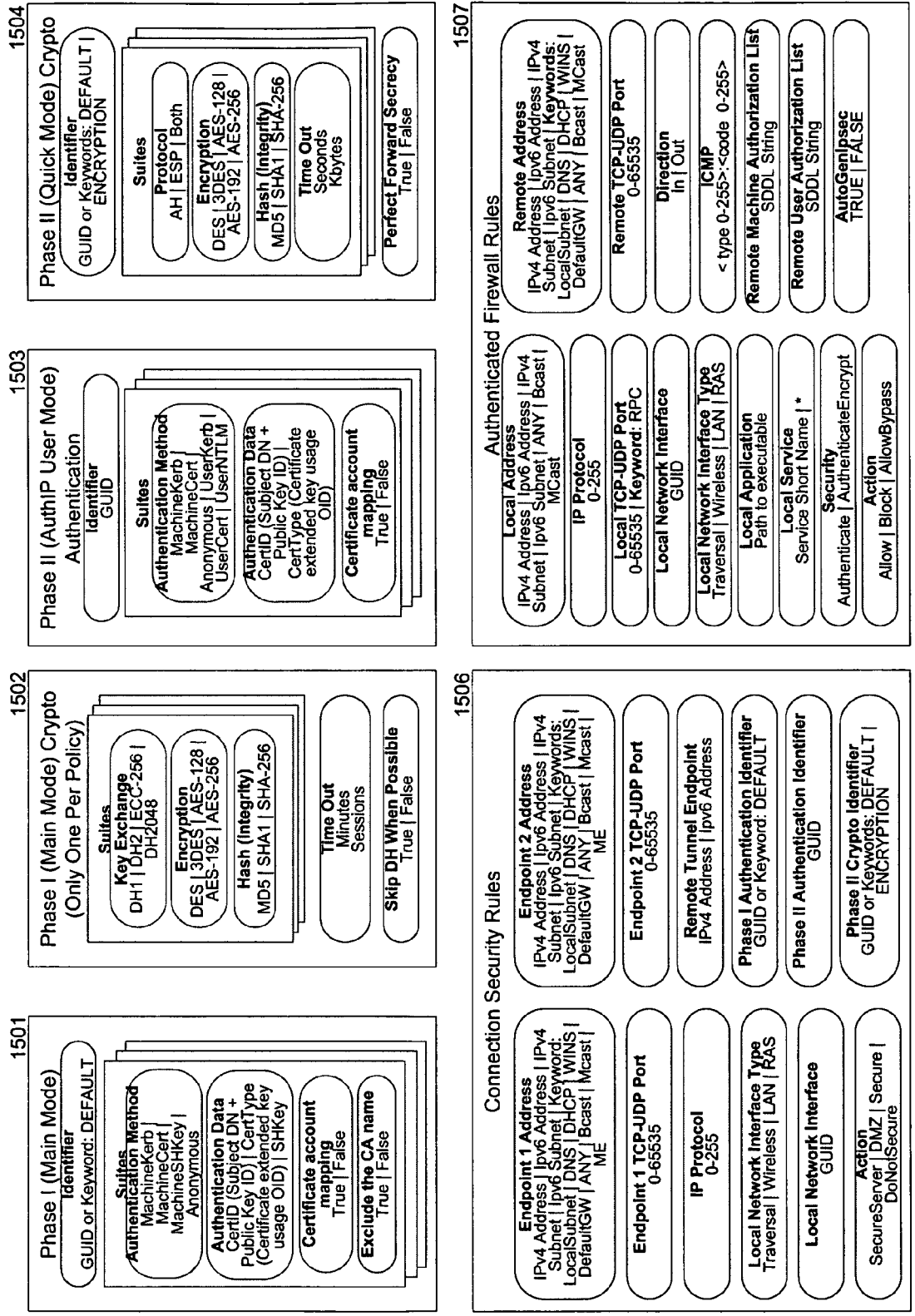
FIG. 15 is a block diagram that illustrates data structures of the security system in one embodiment.

FIG. 15 is a block diagram that illustrates data structures of the security system in one embodiment. The data structures include security suites 1501-1504 and rules 1506-1507. The data structures may be stored as part of the registry of a host computing device in one embodiment. The security suites 1501 define authentication sets for the main mode of IPsec. Each authentication set identifies an authentication method and authentication data. The security suites 1502 define key exchange crypto suites for the main mode of IPsec. A key exchange crypto suite includes a key exchange algorithm, an encryption algorithm, and an integrity algorithm. The security suites 1503 define the authentication sets for quick mode of IPsec. A authentication set identifies an authentication method and authentication data. The security suites 1504 define the data protection crypto suites for the quick mode of IPsec. The crypto suites include the protocol, encryption algorithm, and integrity algorithm. The connection security rules and the authenticated firewall rules define rules for IPsec and a firewall, respectively. Table 1 defines the fields of the authenticated firewall rules, and table 2 defines the fields of the connection security rules.

TABLE 1

| # | Field | Name | Field Syntax | If not present | Comments | |
|---|---|---|---|---|---|---|
| 1 | Version | | The version format is v<Major>.<minor> | Rule rejected. | The version is mandatory and is the first field in the rule string. It is not a name value pair, just the field syntax. | |
| 2 | Action | Action | Block | Allow | AllowBypass | Rule rejected. | The action field is mandatory. | |
| 3 | Name | Name | The name can be either a text name or a reference into a dll's resource string. The dll resource format is: @<dll filename>,index. The dll filename can be a full path including environment variables (%x%). | | This is for display purposes. It is different than the registry value name. | |
| 4 | Direction | Dir | In | Out | Rule rejected. | | |
| 5 | Local Application | App | Full path to executable | If neither application or service is present, then the rule applies to all applications and services. | Path can include environment variables (%x%). | If both a service and application are specified then the rule applies only to the service that is running inside the specified application. This qualifies the rule to apply to traffic originating from or received by the specified application or service. It is evaluated only on the machine described in this rule by the local address. |
| 6 | Local Service | Svc | Service Name Short Name or * | | The Service SID can be generated from service name. * indicates all services. | |
| 7 | Local Network Interface | IF | GUID | If there are no IF, IFType, LA4, or LA6 fields, then the rule applies to all local addresses and Network Interfaces. | The interfaces' guides are defined in string values that are found in this pattern: HKEY_LOCAL_MACHINE\SOFTWARE\Microsoft\WindowsNT\CurrentVersion\NetworkCards\<n>\Service Name <n> is an arbitrary integer key. | |
| 8 | Local Network Interface Type | IFType | Traversal | Wireless | LAN | RAS | | | |
| 9 | Local IPv4 Address | LA4 | Single address, subnet or range expression<br>ip address xx.xx.xx.xx<br>ip subnet xx.xx.xx.xx/n<br>ip address range xx.xx.xx.xx-xx.xx.xx.xx<br>Broadcast Keyword: Bcast<br>Multicast Keyword: MCast | | The n in the ip subnet syntax is an integer in the range 1-32. | |
| 10 | Local IPv6 Address | LA6 | Single address, subnet or range expression<br>ip address xxxx:xxxx:xxxx:xxxx:xxxx:xxxx:xxxx:xxxx<br>ip subnet xxxx:xxxx:xxxx:xxxx:xxxx:xxxx:xxxx:xxxx/n<br>ip address range xxxx:xxxx:xxxx:xxxx:xxxx:xxxx:xxxx:xxxx-xxxx:xxxx:xxxx:xxxx:xxxx:xxxx:xxxx:xxxx<br>Broadcast Keyword: Bcast<br>Multicast Keyword: MCast | | An IPv6 address can be fully represented, or shortened by either removing leading zeros or zero compression. The n in the ip subnet syntax is an integer in the range 1-128. | |
| 11 | Remote IPv4 Address | RA4 | Single address, subnet or range expression<br>ip address xx.xx.xx.xx<br>ip subnet xx.xx.xx.xx/n<br>ip address range xx.xx.xx.xx-xx.xx.xx.xx<br>local subnet Keyword: LocalSubnet<br>DNS Servers Keyword: DNS<br>WINS Servers Keyword: WINS<br>DHCP Servers Keyword: DHCP<br>Default Gateway Keyword: DefaultGW<br>Broadcast Keyword: Bcast<br>Multicast Keyword: MCast | If there are no Remote IPv4 or IPv6 Address fields, then the rule applies to all Remote addresses. | The n in the ip subnet syntax must be an integer in the range 1-32. | |

TABLE 1-continued

| # | Field | Name | Field Syntax | If not present | Comments |
|---|---|---|---|---|---|
| 12 | Remote IPv6 Address | RA6 | Single address, subnet or range expression<br>ip address   xxxx:xxxx:xxxx:xxxx:<br>                    xxxx:xxxx:xxxx:xxxx<br>ip subnet    xxxx:xxxx:xxxx:xxxx:<br>                    xxxx:xxxx:xxxx:xxxx/n<br>ip address range  xxxx:xxxx:xxxx:xxxx:<br>                    xxxx:xxxx:xxxx:xxxx-<br>                    xxxx:xxxx:xxxx:xxxx:<br>                    xxxx:xxxx:xxxx:xxxx<br>local subnet    Keyword: LocalSubnet<br>DNS Servers    Keyword: DNS<br>WINS Servers   Keyword: WINS<br>DHCP Servers   Keyword: DHCP<br>Default Gateway Keyword: DefaultGW<br>Broadcast       Keyword: Bcast<br>Multicast        Keyword: MCast | | An IPv6 address can be fully represented, or shortened by either removing leading zeros or zero compression. The n in the ip subnet syntax is an integer in the range 1-128. |
| 13 | Local Port | LPort | Single port, Range or dynamic RPC port set<br>Single port     Integer: Min = 0,<br>                  Max = 65535<br>Port Range    <low bound Integer>-<br>                  <upper bound Integer><br>Dynamic RPC  Keyword: RPC<br>port set | Rule applies to all local/remote ports. | Protocol = 6 (TCP) or Protocol = 17 (UDP) is specified else the rule is invalid.<br>The RPC keyword indicates that the local host's set of open, listening RPC ports is dynamically resolved to define the rule's local port setting when the policy is evaluated. |
| 14 | Remote Port | RPort | Single port, range or dynamic RPC port set<br>Single port     Integer: Min = 0,<br>                  Max = 65535<br>Port Range    <low bound Integer>-<br>                  <upper bound Integer> | | |
| 15 | IP Protocol | Protocol | ip protocol number 0-255 | Rule applies to all ip traffic. | |
| 16 | ICMP | ICMP | < type 0-255>:<code 0-255 \| * > | Rule applies to all ICMP traffic only if Protocol = 1 (ICMPv4) or 58 (IPv6-ICMP). | If Protocol = 1 (ICMPv4) or 58 (IPv6-ICMP) is not present, then the presence of this field will result in an invalid rule. Both ICMPv4 and ICMPv6 share the type and code parameters but have different values for equivalent type and code pairs. |
| 17 | Description | Desc | 1024 character Unicode string | | This is for display purposes. |
| 18 | Active | Active | FALSE \| TRUE | The rule is enforced. | If False then rule is not enforced. |
| 19 | Remote Machine Authorization List | RMAuth | SDDL String | No authorization is applied to the remote machine. | This authorization check is evaluated by the machine described in this rule by the local address, restricting the remotely authenticated machine to those described in the list. If the remote machine is not present in this list, then this rule does not allow or block access. |
| 20 | Remote User Authorization List | RUAuth | SDDL String | No authorization is applied to the remote user. | This authorization check is evaluated by the machine described in this rule by the local address, restricting the remotely authenticated user to those described in the list.<br>If the remote user is not present in this list, then this rule does not allow or block access. |
| 21 | Security | Security | Authenticate \| AuthenticateEncrypt | Traffic allowed unencrypted. | Authenticate adds the condition that the specified traffic is IPsec protected. AuthenticateEncrypt adds the condition that the specified traffic is IPsec protected and encrypted. NotRequired specifies that there is no restriction based on IPsec protection. Traffic protected and clear is equally allowed. |
| 22 | Embedded Context | EmbedCtx | 1024 character Unicode string | No effect on rule. | This is ignored by the service. It is used to group rules, such as these firewall services: Remote Administration or File and Printer Sharing, into single concepts presented in the UI, Netsh and COM APIs, and to persist address data exactly as the author inputted it. |
| 23 | Platform Validity | Platform | <PlatformID>:<Major Version>:<Minor Version> | Rule applies to all versions. | Windows 2000 = 2.5.0<br>XP = 2.5.1 |
| 24 | Auto Generate | AutoGen-IPsec | TRUE \| FALSE | AutoGen is off. | If True the engine will attempt to generate IPsec Rules to cause the IPsec protection this rule requires. |

TABLE 2

| # | Field | Name | Field Syntax | If not present | Comments |
|---|---|---|---|---|---|
| 1 | Version | | The version format is v<Major>.<minor> | Rule rejected. | The version is mandatory and is the first field in the rule string. It is not a name value pair, just the field syntax. |
| 2 | Name | Name | It can be either a text name or a reference into a dll's resource string. The dll resource format is: @<dll filename>,index. The dll filename can be a full path including environment variables (%x%). | | This is for display purposes. It is different than the registry value name. |
| 3 | Local Network Interface | IF | GUID | The rule applies to all Network Interfaces. | The interfaces' guides are defined in string values that are found in this pattern: HKEY_LOCAL_MACHINE\SOFTWARE\ Microsoft\WindowsNT\ CurrentVersion\NetworkCards\ <n>\ServiceName <n> is an arbitrary integer key. |
| 4 | Local Network Interface Type | IFType | Traversal \| Wireless \| LAN \| RAS | The rule applies to all Network Interfaces. | |
| 5 | Endpoint 1 IPv4 Address | EP1_4 | Single address, subnet or range expression<br>ip address     xx.xx.xx.xx<br>ip subnet     xx.xx.xx.xx/n<br>ip address range     xx.xx.xx.xx-xx.xx.xx.xx<br>local subnet     Keyword: LocalSubnet<br>DNS Servers     Keyword: DNS<br>WINS Servers     Keyword: WINS<br>DHCP Servers     Keyword: DHCP<br>Default Gateway     Keyword: DefaultGW<br>Broadcast     Keyword: Bcast<br>Multicast     Keyword: MCast<br>Current Host     Keyword: Me | If neither EP1_4 or EP1_6 is specified, then the rule applies to any address. | The n in the ip subnet syntax is an integer in the range 1-32. Keywords can only be specified in either the source or destination address with the exception of Me which can be specified in source or destination when the opposite is any other value. |
| 6 | Endpoint 1 IPv6 Address | EP1_6 | Single address, subnet or range expression<br>ip address     xxxx:xxxx:xxxx:xxxx:<br>         xxxx:xxxx:xxxx:xxxx<br>ip subnet     xxxx:xxxx:xxxx:xxxx:<br>         xxxx:xxxx:xxxx:xxxx/n<br>ip address range     xxxx:xxxx:xxxx:xxxx:<br>         xxxx:xxxx:xxxx:xxxx-<br>         xxxx:xxxx:xxxx:xxxx:<br>         xxxx:xxxx:xxxx:xxxx<br>DNS Servers     Keyword: DNS<br>WINS Servers     Keyword: WINS<br>DHCP Servers     Keyword: DHCP<br>Default Gateway     Keyword: DefaultGW<br>Broadcast     Keyword: Bcast<br>Multicast     Keyword: MCast<br>Current Host     Keyword: Me | | An IPv6 address can be fully represented, or shortened by either removing leading zeros or zero compression. The n in the ip subnet syntax is an integer in the range 1-128. Keywords can be specified in either the source or destination address with the exception of Me which can be specified in source or destination when the opposite is any other value. |
| 7 | Endpoint 2 IPv4 Address | EP2_4 | Single address, subnet or range expression<br>ip address     xx.xx.xx.xx<br>ip subnet     xx.xx.xx.xx/n<br>ip address range     xx.xx.xx.xx-xx.xx.xx.xx<br>local subnet     LocalSubnet<br>DNS Servers     Keyword: DNS<br>WINS Servers     Keyword: WINS<br>DHCP Servers     Keyword: DHCP<br>Default Gateway     Keyword: DefaultGW<br>Broadcast     Keyword: Bcast<br>Multicast     Keyword: MCast<br>Current Host     Keyword: Me | If neither EP2_4 or EP2_6 is specified, then the rule applies to any address. | The n in the ip subnet syntax is an integer in the range 1-32. Keywords can only be specified in either the source or destination address with the exception of Me which can be specified in source or destination when the opposite is any other value. |
| 8 | Endpoint 2 IPv6 Address | EP2_6 | Single address, subnet or range<br>ip address     xxxx:xxxx:xxxx:xxxx:<br>         xxxx:xxxx:xxxx:xxxx<br>ip subnet     xxxx:xxxx:xxxx:xxxx:<br>         xxxx:xxxx:xxxx:xxxx/n<br>ip address range     xxxx:xxxx:xxxx:xxxx:<br>         xxxx:xxxx:xxxx:xxxx-<br>         xxxx:xxxx:xxxx:xxxx:<br>         xxxx:xxxx:xxxx:xxxx<br>local subnet     LocalSubnet<br>DNS Servers     Keyword: DNS<br>WINS Servers     Keyword: WINS<br>DHCP Servers     Keyword: DHCP<br>Default Gateway     Keyword: DefaultGW<br>Broadcast     Keyword: Bcast<br>Multicast     Keyword: MCast<br>Current Host     Keyword: Me | | An IPv6 address can be fully represented, or shortened by either removing leading zeros or zero compression. The n in the ip subnet syntax must be an integer in the range 1-128. Keywords can be specified in either the source or destination address with the exception of Me which can be specified in source or destination when the opposite is any other value. |

TABLE 2-continued

| # | Field | Name | Field Syntax | | If not present | Comments |
|---|---|---|---|---|---|---|
| 9 | Endpoint 1 Port | EP1Port | Single port or dynamic RPC port set<br>Single port<br>Dynamic RPC port set | Integer: Min = 0, Max = 65535<br>Keyword: RPC | Rule applies to all ports. | Protocol = 6 (TCP) or Protocol = 17 (UDP) is specified else the rule is invalid.<br>The RPC keyword can only be specified if the corresponding source or destination address is set to Keyword: Me.<br>The RPC keyword indicates that the local host's set of open, listening RPC ports is dynamically resolved to define the rule's local port setting. |
| 10 | Endpoint 2 Port | EP2Port | Single port or dynamic RPC port set<br>Single port<br>Dynamic RPC port set | Integer: Min = 0, Max = 65535<br>Keyword: RPC | | |
| 11 | IP Protocol | Protocol | ip protocol number 0-255 | | Rule applies to all ip traffic. | |
| 12 | Phase I Authentication Set | Auth1Set | GUID | | Default Phase I Authentication Set is used. | |
| 13 | Phase II Authentication Set | Auth2Set | GUID | | No secondary AuthIp authentication is performed. | |
| 14 | Phase II Crypto Set | Crypto2Set | GUID | | Default Crypto Set is used. | |
| 15 | Embedded Context | EmbedCtx | 1024 character Unicode string | | No effect on rule. | This is ignored by the service. It is used to group rules, such as these firewall services: Remote Administration or File and Printer Sharing, into single concepts presented in the UI, Netsh, and COM APIs, and to persist address data as input. |
| 16 | Platform Validity | Platform | <PlatformID>:<Major Version>:<Minor Version> | | Rule applies to all versions. | Windows 2000 = 2.5.0 XP = 2.5.1 |
| 17 | Description | Desc | 1024 character Unicode string | | | This is for display purposes. |
| 18 | Active | Active | FALSE \| TRUE | | The rule is enforced. | If False then rule is not enforced. |
| 19 | Remote Tunnel Endpoint IPv4 Address | RTunnel4 | Single address<br>ip address | xx.xx.xx.xx | Rule does not describe a tunnel. | There can be no more than one Remote Tunnel Endpoint IPv4 or IPv6 Address specified per rule. If a rule describes a tunnel, then the Remote Tunnel Endpoint is specified. |
| 20 | Remote Tunnel Endpoint IPv6 Address | RTunnel6 | Single address<br>ip address | xxxx:xxxx:xxxx:xxxx:<br>xxxx:xxxx:xxxx:xxxx | | |
| 21 | Action | Action | SecureServer \| DMZ \| Secure \| DoNotSecure | | Rule rejected. | |

Figure 16:
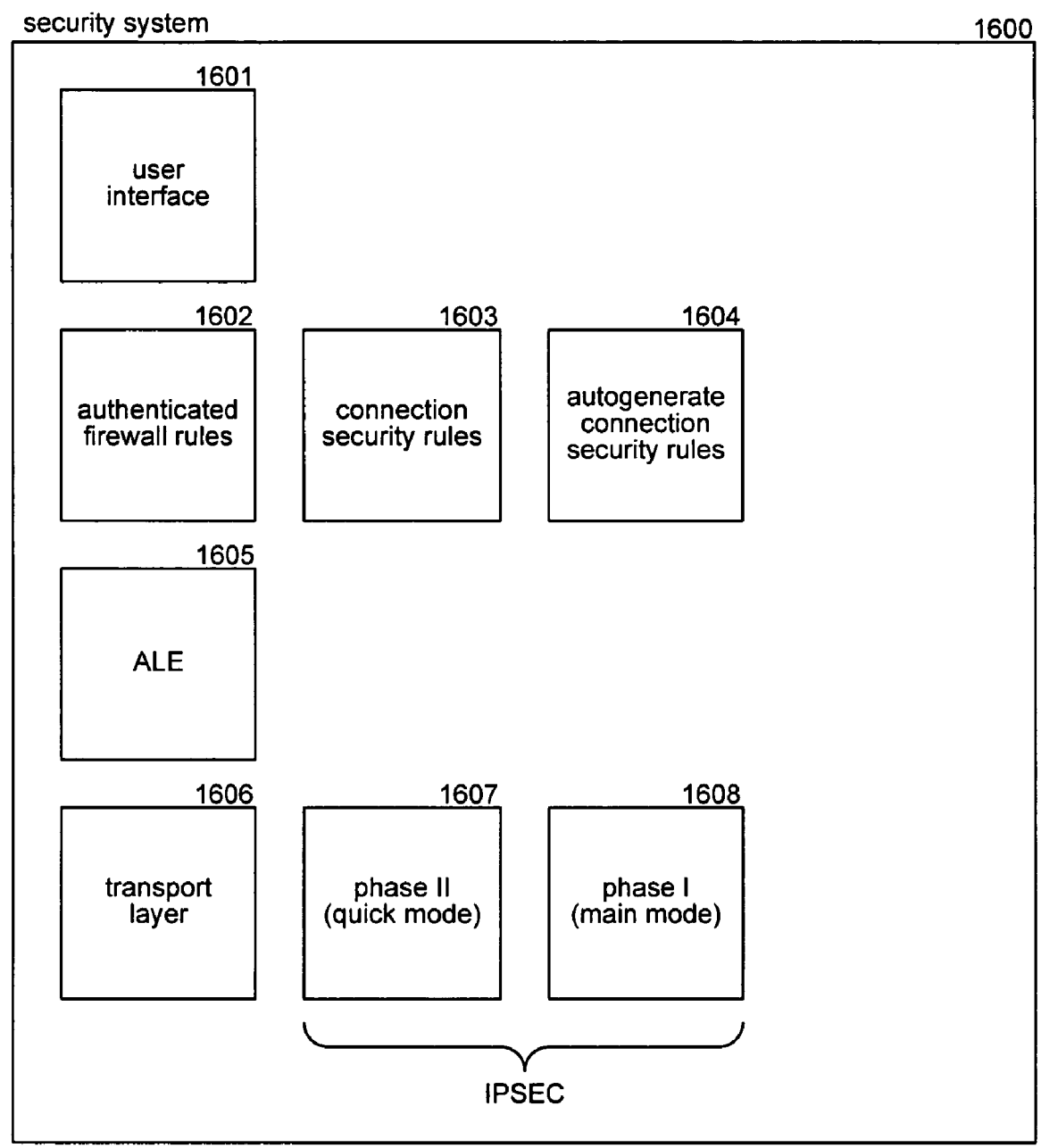
FIG. 16 is a block diagram that illustrates components of the security system in one embodiment.

FIG. 16 is a block diagram that illustrates components of the security system in one embodiment. The security system 1600 includes a user interface component 1601, an authenticated firewall rules store 1602, a connection security rules store 1603, an auto-generate connection security rules component 1604, an ALE component 1605, a transport layer engine 1606, a phase II of IPsec component 1607, and a phase I of IPsec component 1608. The user interface component provides the user interface of FIGS. 1-14 and generates and stores the authenticated firewall rules in the authenticated firewall rules store. The user interface component may also store user-defined custom connection security rules in the connection security rules store. The auto-generate connection security rules component executes on a host computer to generate connection security rules from the authenticated firewall rules. The auto-generate connection security rules component is described in detail below. The ALE component performs application layer filtering and enforces the firewall rules of the authenticated firewall rules store and may take into consideration connection security information that may be passed from the transport layer engine. The transport layer engine enforces the connection security rules by invoking the IPsec components.

The computing devices on which the security system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

The security system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The security system may also be implemented on computing devices such as cell phones, personal digital assistants, consumer electronics, home automation devices, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 17:
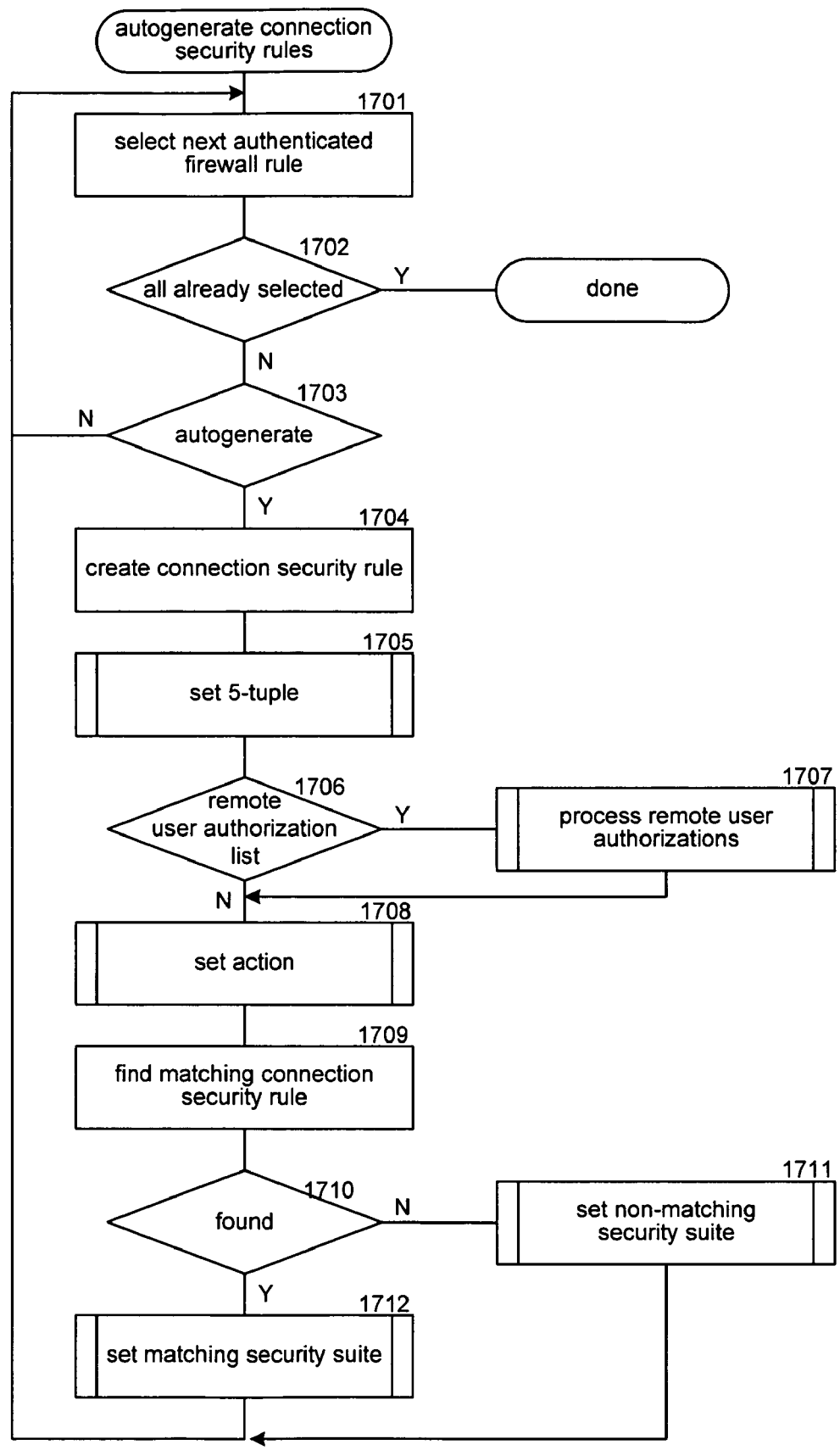
FIG. 17 is a flow diagram that illustrates the processing of the auto-generate connection security rules component in one embodiment.

FIG. 17 is a flow diagram that illustrates the processing of the auto-generate connection security rules component in one embodiment. The component is invoked to generate the connection security rules from the authenticated firewall rules. Each authenticated firewall rule has a flag that indicates whether a corresponding connection security rule should be automatically generated. The user interface component sets the flag for each authenticated firewall rule that it creates. In block 1701, the component selects the next authenticated firewall rule. In decision block 1702, if all the authenticated firewall rules have already been selected, then the component completes, else the component continues at block 1703. In decision block 1703, if the rule indicates to automatically generate a connection security rule, then the component continues at block 1704, else the component loops to block 1701 to select the next authenticated firewall rule. In block 1704, the component creates a connection security rule data structure. In block 1705, the component invokes the set 5-tuple component to establish the local and remote addresses and ports and protocol for the connection security rule. In decision block 1706, if the selected authenticated firewall rule includes a remote user authorization list, then the component continues at block 1707, else the component continues at block 1708. In block 1707, the component invokes the process remote user authorization component which determines whether an authentication suite for users has been defined for phase II of IPsec. In block 1708, the component invokes the set action component to set the action for the connection security rule. In block 1709, the component determines whether there is a matching connection security rule that matches either the 5-tuple or the 2-tuple (i.e., source and destination address). In decision block 1710, if a match is found, then the component continues at block 1712, else the component continues at block 1711. In block 1711, the component invokes the set non-matching security suite component to set the authentication method and crypto suites for the connection security rule based on the defaults. In block 1712, the component invokes the set matching security component to set the authentication and crypto suites based on the matching connection security rule. The component then loops block 1701 to select the next authenticated firewall rule.

Figure 18:
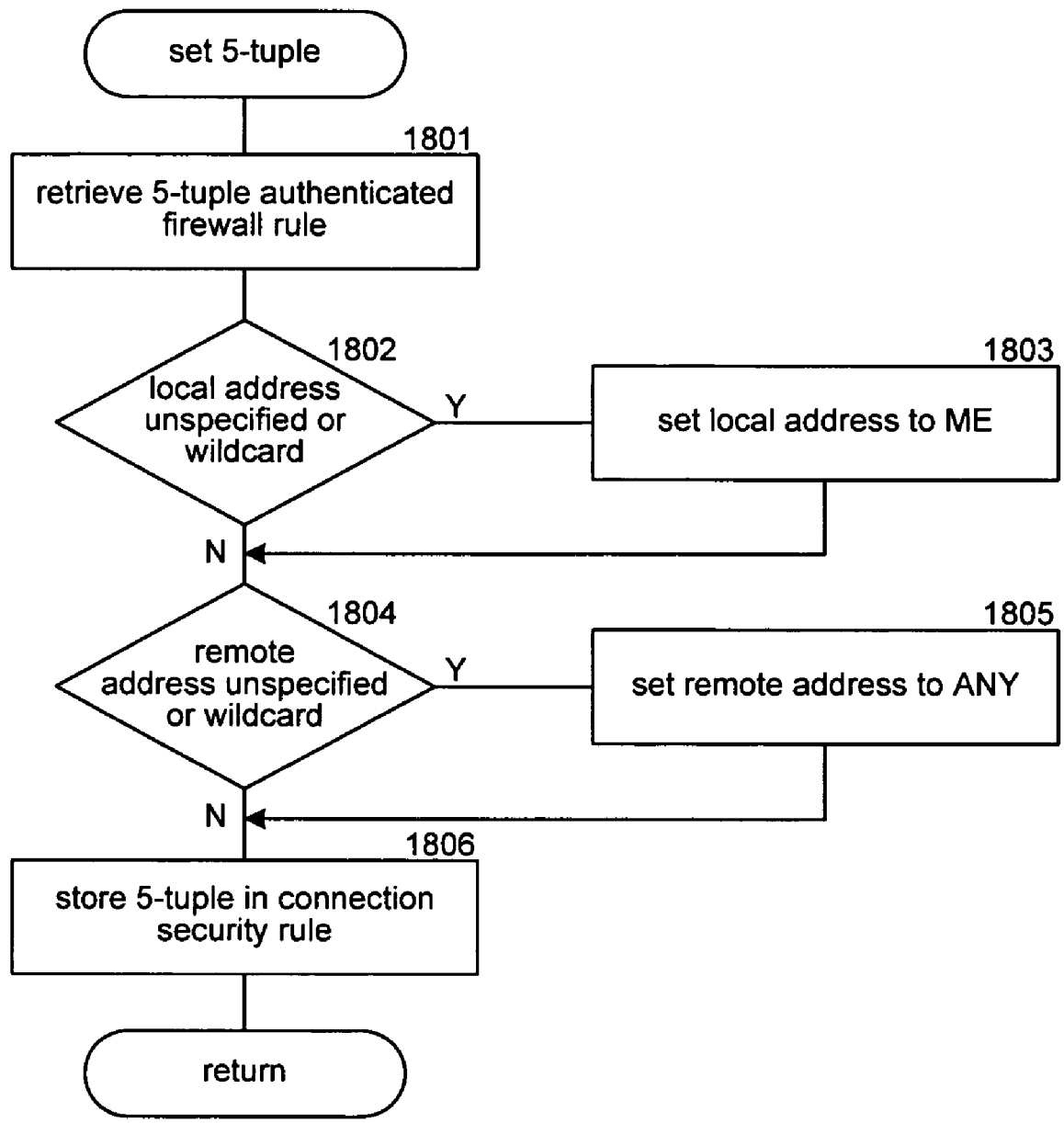
FIG. 18 is a flow diagram that illustrates the processing of the set 5-tuple component in one embodiment.

FIG. 18 is a flow diagram that illustrates the processing of the set 5-tuple component in one embodiment. The component sets the 5-tuple (i.e., local address, local port, remote address, remote port, and protocol) of the connection security rule based on the 5-tuple of the selected authenticated firewall rule. In block 1801, the component retrieves the 5-tuple of the authenticated firewall rule. In decision block 1803, if the local address is unspecified or is a wildcard, then the component sets the local address to point to the host computer in block 1803, else the component continues at block 1804. In decision block 1804, if the remote address is unspecified or a wildcard, then the component sets the remote address to point to any computer in block 1805, else the component continues at block 1806. In block 1806, the component stores the 5-tuple as modified in the connection security rule and then returns.

Figure 19:
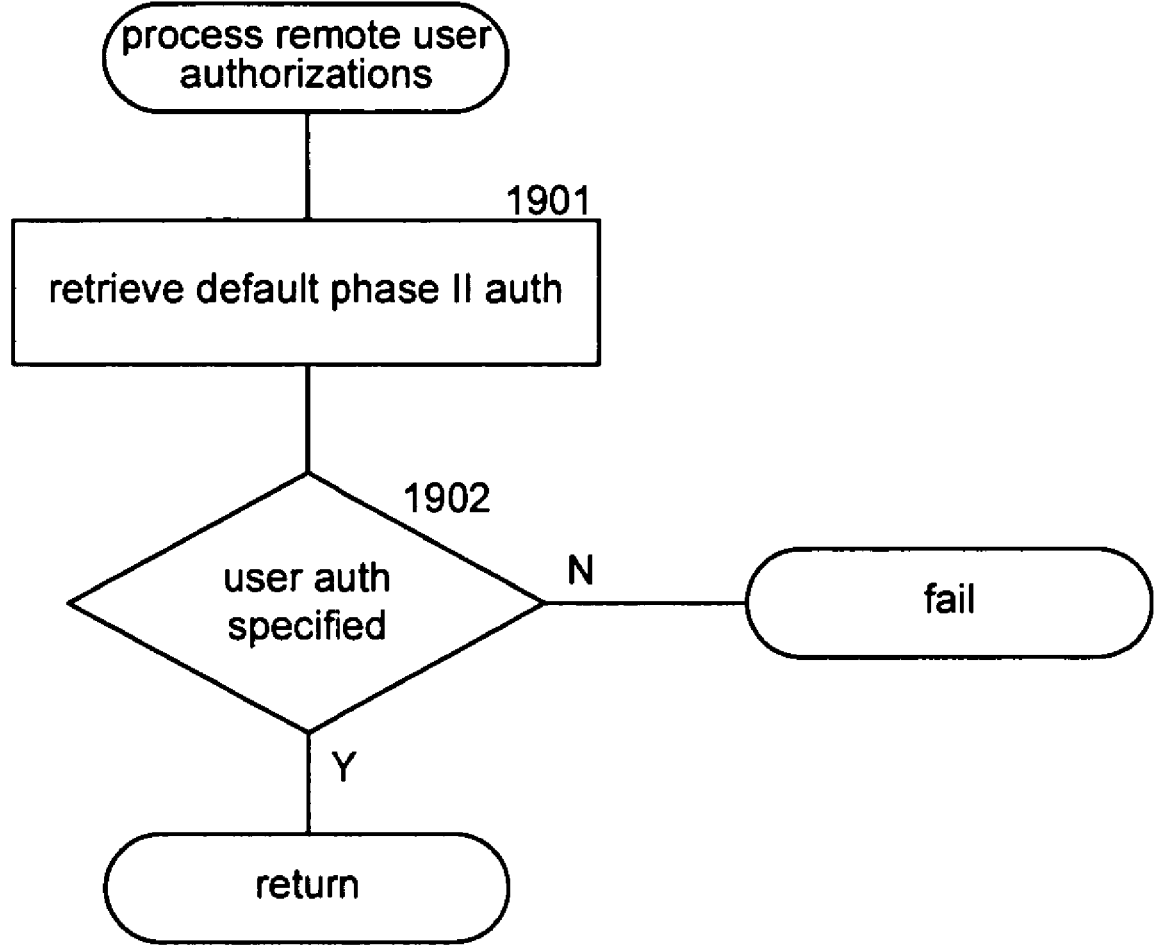
FIG. 19 is a flow diagram that illustrates the processing of the process remote user authorization list component in one embodiment.

FIG. 19 is a flow diagram that illustrates the processing of the process remote user authorization list component in one embodiment. The component is invoked to ensure that a phase II authentication suite has been defined. In block 1901, the component retrieves the default phase II authentication suite. In decision block 1902, if user authentication is specified, then the component returns, else the component fails the generation of the connection security rule.

Figure 20:
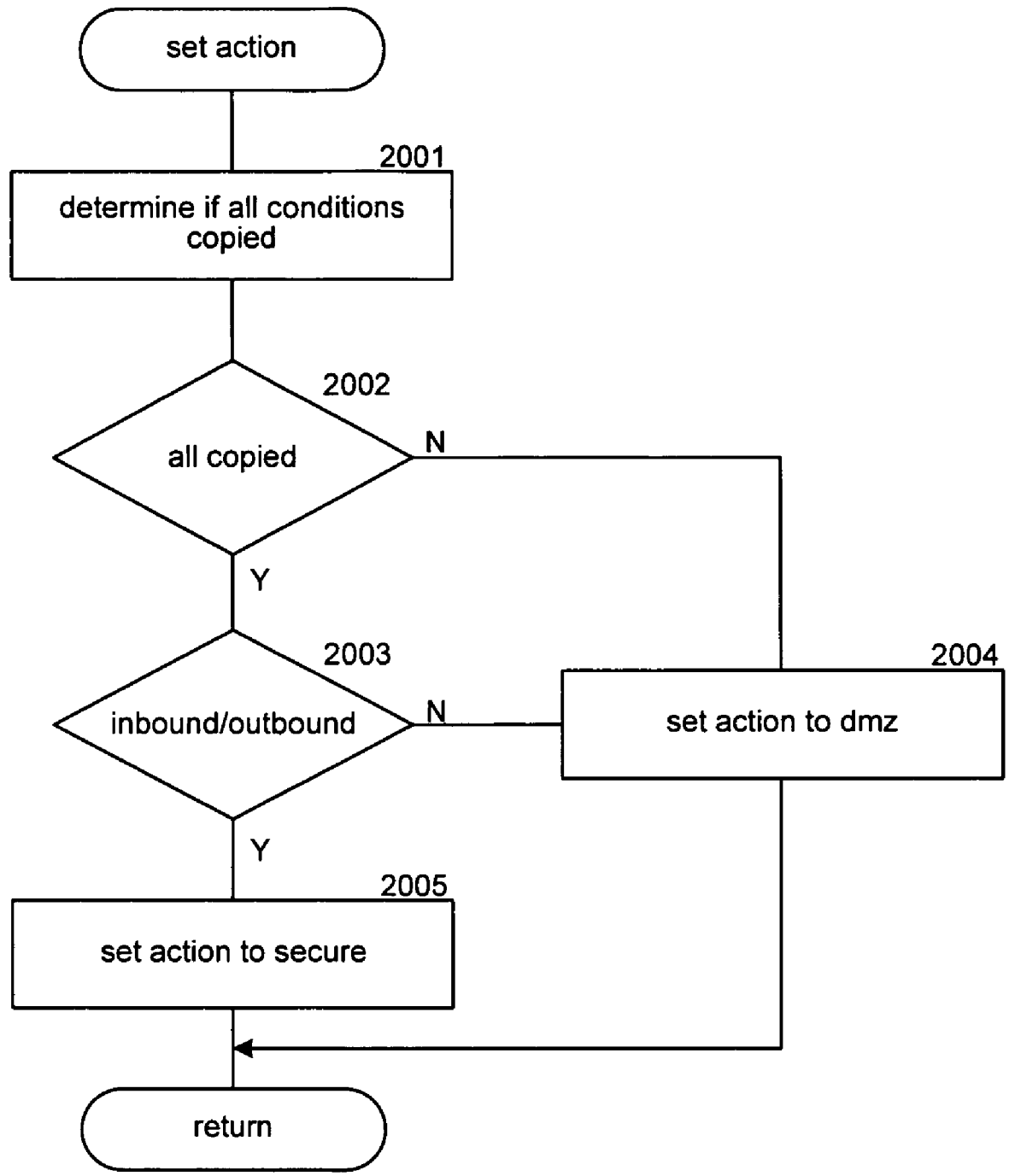
FIG. 20 is a flow diagram that illustrates the processing of the set action component in one embodiment.

FIG. 20 is a flow diagram that illustrates the processing of the set action component in one embodiment. The component sets the action to secure when all the conditions can be copied and the authenticated firewall rule applies to both inbound and outbound traffic. Otherwise, the component sets the action to DMZ. A condition such as application name cannot be copied to a connection security rule because the transport layer does not have knowledge of the application to which data is directed. The action of secure indicates that data will be allowed only if it can be sent securely. The action of DMZ indicates that if the data that matches the 5-tuple cannot be sent securely, it will be sent in the clear. However, it may be denied by the ALE layer. In block 2001, the component determines whether all the conditions have been copied. In decision block 2002, if all the conditions have been copied, then the component continues at block 2003, else the component continues at block 2004. In decision block 2003, if the authenticated firewall rule applies to both inbound and outbound traffic (e.g., one rule may apply to inbound traffic and another rule may apply to outbound traffic or a single rule may apply to both inbound and outbound traffic), then the component continues at block 2005, else the component continues at block 2004. In block 2004, the component sets the action to DMZ and returns. In block 2005, the component sets the action to secure and then returns.

Figure 21:
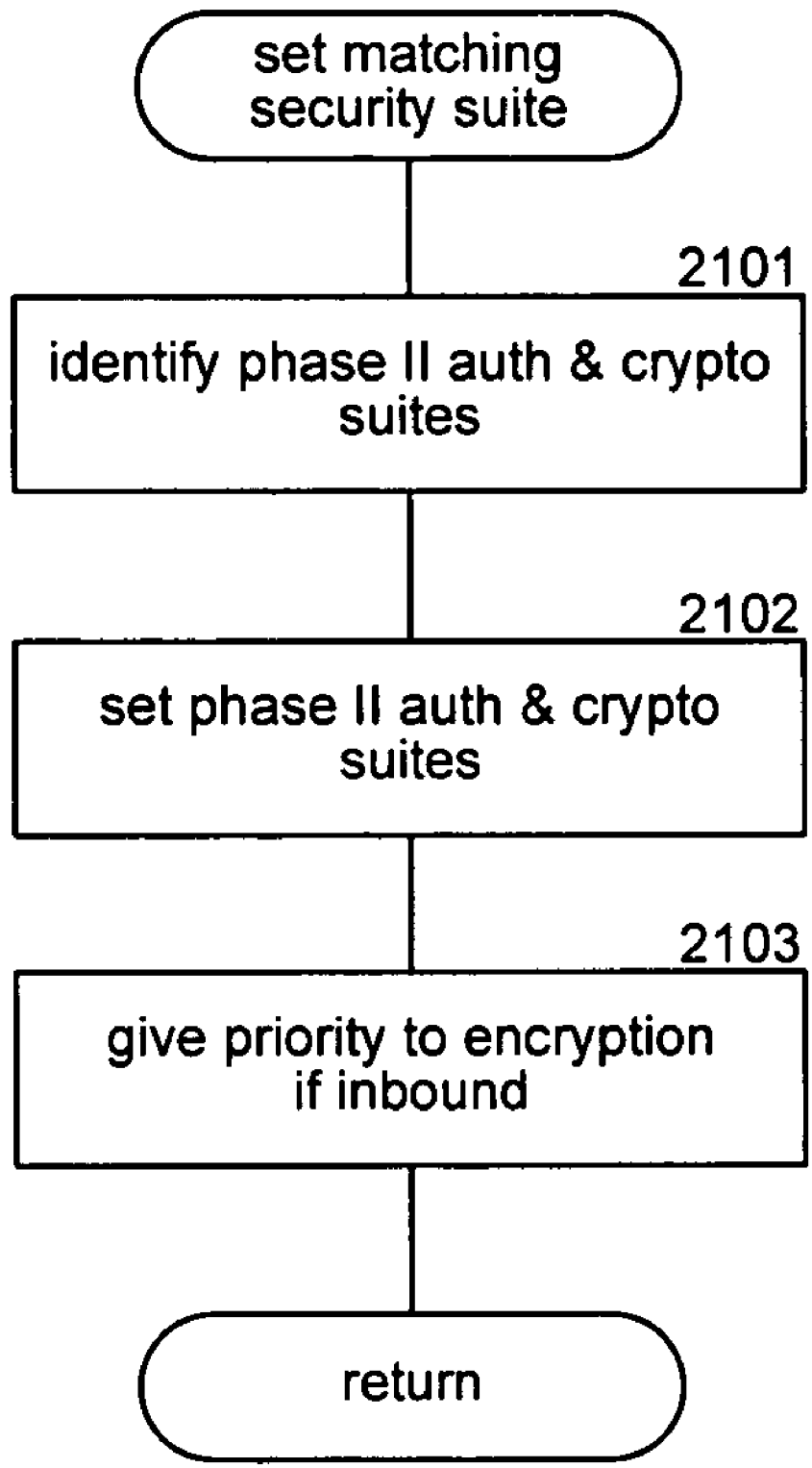
FIG. 21 is a flow diagram that illustrates the processing of the set matching security suites component in one embodiment.

FIG. 21 is a flow diagram that illustrates the processing of the set matching security suites component in one embodiment. The component sets the security suites for the connection security rule based on a matching connection security rule. In blocks 2101-2102, the component sets the phase II authentication method and crypto suites based on the matching connection security rule. In block 2103, the component gives higher priority to encryption when the rule being created is an inbound rule and returns. The component gives higher priority to the encryption for inbound rule so that the outbound device, which decides on the crypto suite to use during negotiation, will decide upon encryption if its encryption priority is higher than its integrity only priority.

Figure 22:
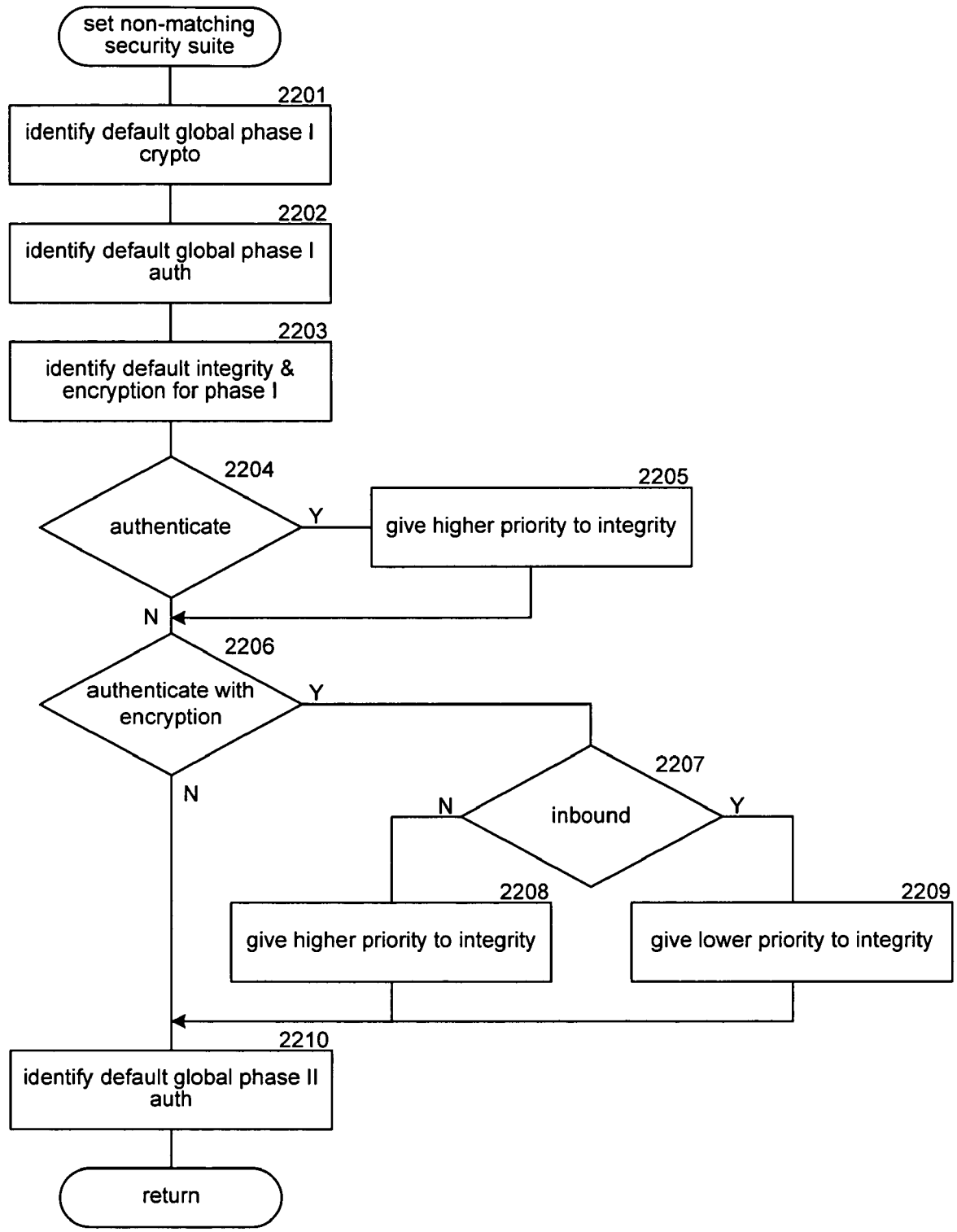
FIG. 22 is a flow diagram that illustrates the processing of the set non-matching security suites component in one embodiment.

FIG. 22 is a flow diagram that illustrates the processing of the set non-matching security suites component in one embodiment. The component sets in the phase I and phase II authentication methods and crypto suites based on the default security suites. In block 2201, the component identifies the default phase I crypto suites. In block 2202, the component identifies the default phase I authentication method. In block 2203, the component identifies the default phase I crypto suites. In decision block 2204, if the authenticated firewall rule indicates authentication only, then in block 2205 the component gives higher priority to the integrity protection. In decision block 2206, if the authenticated firewall rule indicates both authentication and encryption, then the component continues at block 2207, else the component continues at block 2210. In decision block 2207, if the authenticated firewall rule is for inbound only, then the component continues at block 2209, else the component continues at block 2208. In block 2208, the component gives higher priority to integrity protection. In block 2209, the component gives lower priority to integrity protection. In block 2210, the component identifies the default phase II authentication method. The component then sets the security suites of the connection security rule based on the identified authentication methods and crypto suites and then returns.

Figure 23:
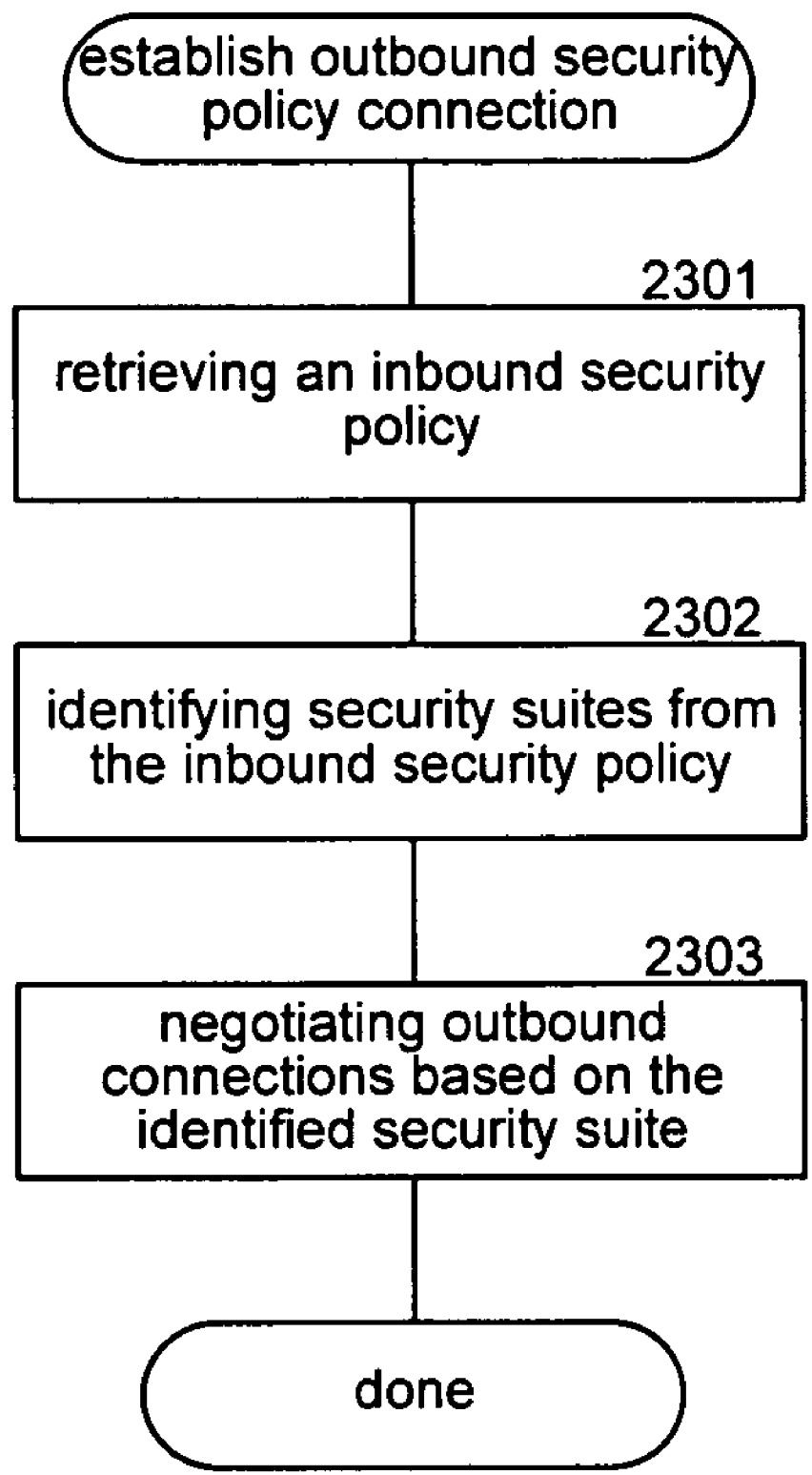
FIG. 23 is a flow diagram that illustrates the processing of a component to establish an outbound security policy for a connection security in one embodiment.

FIG. 23 is a flow diagram that illustrates the processing of a component to establish an outbound security policy for a connection security in one embodiment. The component establishes the outbound security policy based on the security suites of the inbound security policy. In block 2301, the component retrieves an inbound security policy for IPsec that includes security suites. In block 2302, the component identifies the security suites from the inbound security policy. In block 2303, the component negotiates outbound connections based on the identified security suites. In one embodiment, the component may offer multiple security suites when negotiating an outbound connection. The security suites may be ordered based on the complexity of their security algorithms so that preference is given to the least complex security algorithms. The component may also automatically generate security suites based on various combinations of the security algorithms defined in the security suites of the inbound security policy. For example, one security suite may specify an integrity algorithm of SHA1 and an encryption algorithm of 3DES and another security suite may specify an integrity algorithm of SHA-256 and an encryption algorithm of AES-128. In such a case, the component may generate an outbound security suite that specifies an integrity algorithm of SHA1 and an encryption algorithm of AES-128 and an outbound security suite that specifies an integrity algorithm of SHA-256 and an encryption algorithm of 3DES.

Figure 24:
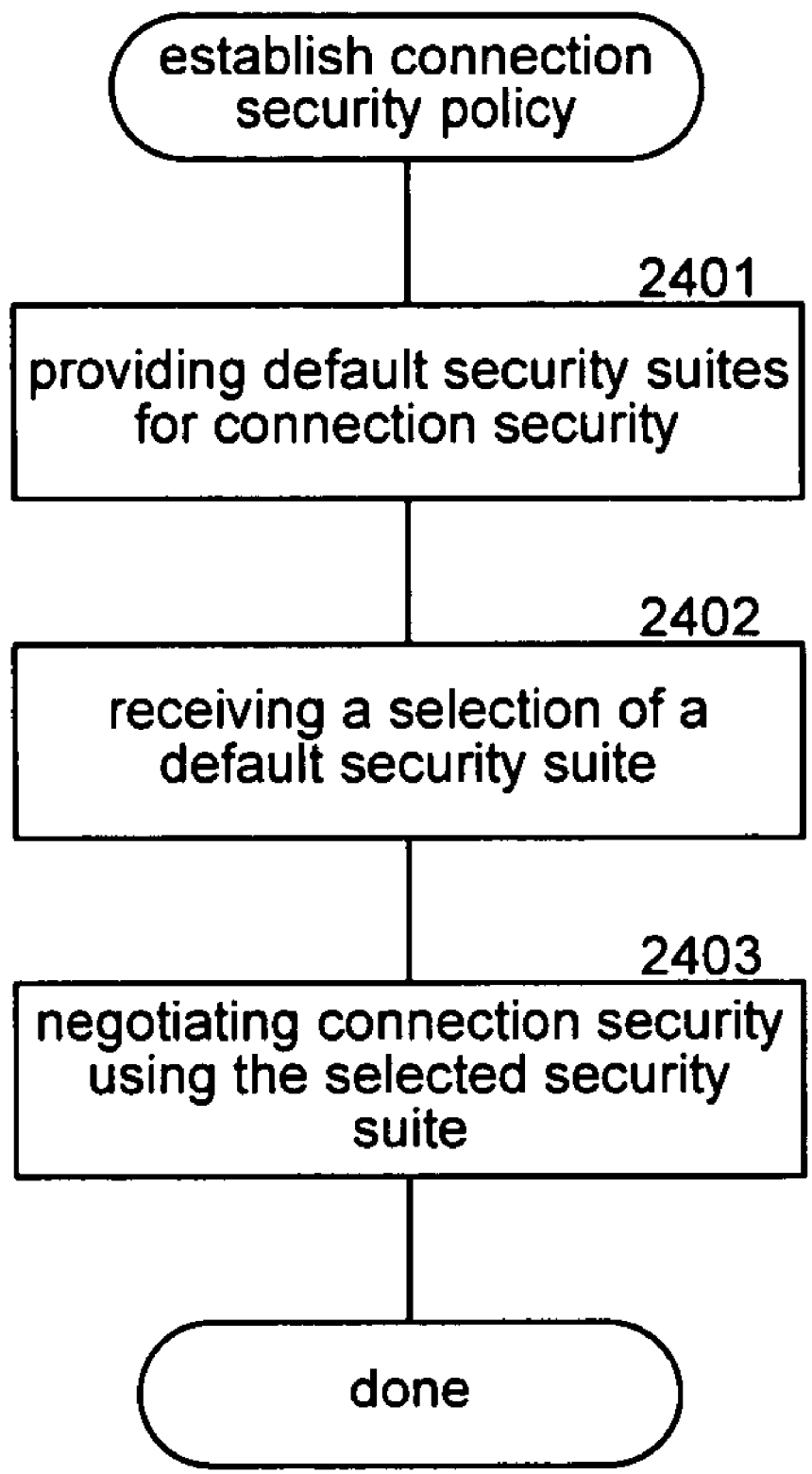
FIG. 24 is a flow diagram that illustrates the processing of the component to establish a connection security policy based on default security suites in one embodiment.

FIG. 24 is a flow diagram that illustrates the processing of the component to establish a connection security policy based on default security suites in one embodiment. In block 2401, the component provides default security suites for connection security. The default security suites may implement a data protection mode based on integrity checking only or based on integrity checking and encryption. In block 2402, the component receives a selection of a data protection mode from an administrator. In block 2403, the component negotiates a connection security using the default security suite associated with the selected data protection mode.

Figure 25:
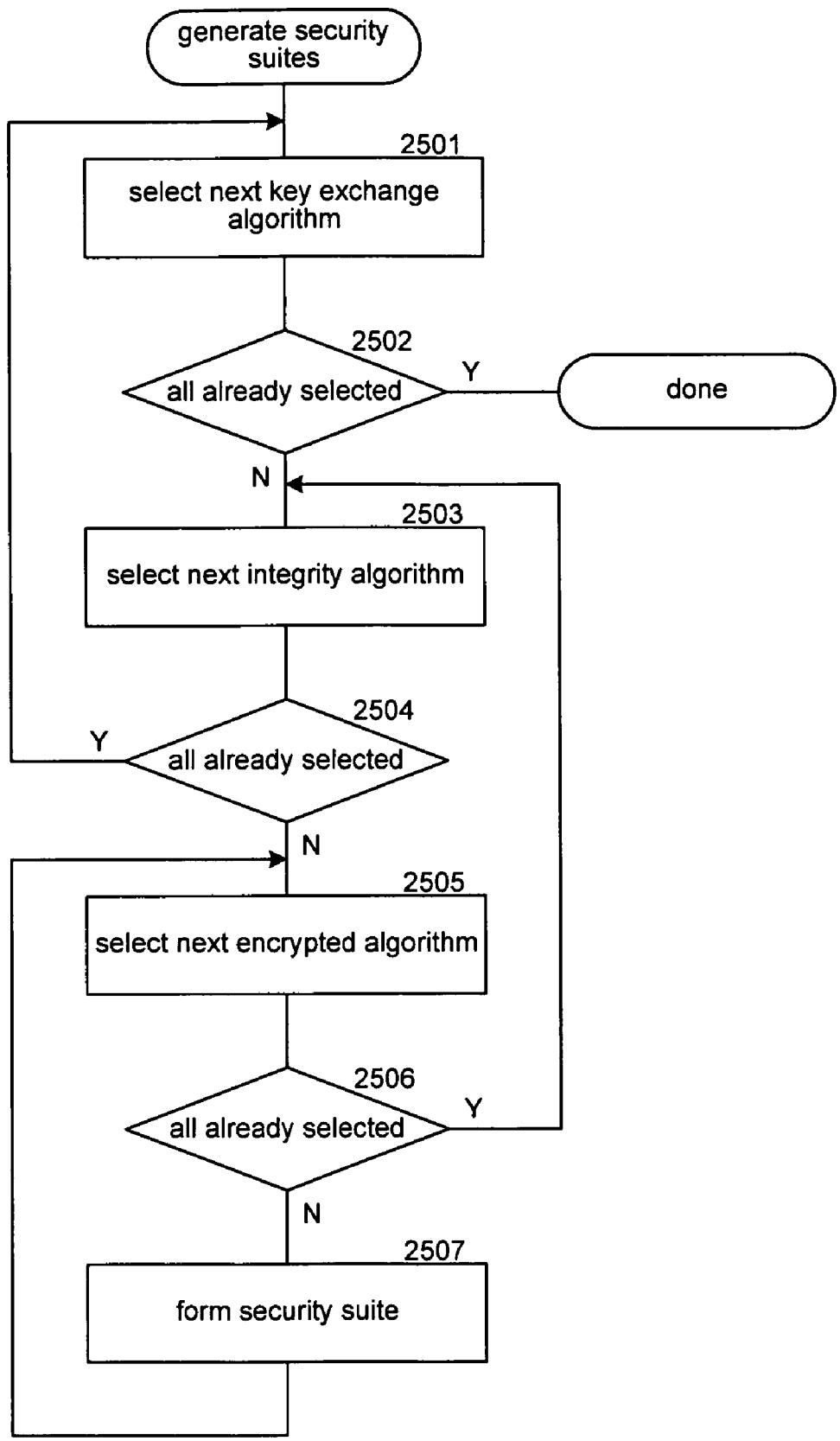
FIG. 25 is a flow diagram that illustrates the processing of a component that automatically generates security suites for main mode of IPsec in one embodiment.

FIG. 25 is a flow diagram that illustrates the processing of a component that automatically generates security suites for a main mode of IPsec in one embodiment. The component generates the security suites based on various combinations of the security algorithms defined by either inbound or outbound security suites of a security policy. In block 2501, the component selects the next key exchange algorithm of a security suite. In decision block 2502, if all the key exchange algorithms have already been selected, then the component completes, else the component continues at block 2503. In block 2503, the component selects the next integrity algorithm of a security suite. In decision block 2504, if all the integrity algorithms have already been selected, then the component loops to block 2501 to select the next key exchange algorithm, else the component continues at block 2505. In block 2505, the component selects the next encryption algorithm of a security suite. In decision block 2506, if all the encryption algorithms have already been selected, the component loops to block 2503 to select the next integrity algorithm, else the component continues at block 2507. In block 2507, the component forms a new security suite based on the selected key exchange algorithm, integrity algorithm, and encryption algorithm. The security system can use the newly formed security suite when negotiating an inbound or outbound connection. The component then loops to block 2505 to select the next encryption algorithm.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a plurality of devices for providing an outbound security policy for outbound connection security, the method comprising:

receiving at a first device and a second device an inbound security policy for inbound connection security, the inbound security policy having security suites, each security suite specifying one or more security algorithms; and effecting an outbound security policy by negotiating an outbound connection from the first device to the second device by offering from the first device to the second device to secure the outbound connection from the first device based on a security suite of the inbound security policy and by offering from the second device to the first device to secure an inbound connection to the second device based on a security suite of the inbound security policy wherein an outbound connection is established from the first device to the second device without having to receive an outbound security policy at the first device.

2. The method of claim 1 wherein the offering includes offering multiple security suites to secure the outbound connection.

3. The method of claim 2 wherein the multiple security suites are offered in an order based on complexity of their security algorithms.

4. The method of claim 1 wherein the security algorithms include integrity algorithms and encryption algorithms.

5. The method of claim 4 wherein the offering includes offering multiple security suites generated from various combinations of the integrity algorithms and the encryption algorithms.

6. The method of claim 5 wherein the security algorithms include an authentication algorithm.

7. The method of claim 1 including receiving an indication of whether the outbound security policy is to provide integrity checking or integrity checking and encryption.

8. The method of claim 7 including providing a default security suite for integrity checking and a default security suite for integrity checking and encryption.

9. The method of claim 1 wherein the outbound security policy is based on the IP security protocol.

10. A computer-readable storage medium containing instructions for controlling a computing device to provide a security policy for connection security, by a method comprising:

providing to the computing device default security suites for connection security;

receiving at the computing device a selection of a default security suite from the provided default security suites; and effecting a security policy by negotiating a connection that is outbound from the computing device and inbound to another computing device by offering to secure the connection based on the selected default security suite wherein the other computing device is provided the default security suites and accepts the offer to secure the connection based on being provided with the same default security suites as the computing device.

11. The computer-readable medium of claim 10 wherein a default security suite is selected on a rule-by-rule basis.

12. The computer-readable medium of claim 10 wherein a security suite includes an integrity algorithm and an encryption algorithm.

13. The computer-readable medium of claim 12 wherein a security suite includes an authentication algorithm.

14. The computer-readable medium of claim 10 wherein the security policy is based on the IP security protocol.

15. A computing system for providing an outbound security policy for connection security for an outbound connection from a first device to a second device, comprising:

an inbound security policy store at the first device and the second device storing an inbound security policy for connection security, the inbound security policy having security suites;

a component of the first device that enforces the inbound security policy in accordance with the inbound security policy for an inbound connection between the first device and the second device; and a component of the second device that enforces an outbound security policy when negotiating an outbound connection by offering to the first device to secure the outbound connection based on a security suite of the inbound security policy so that devices that store the inbound security policy can establish connections without having to store an outbound security policy wherein the components are implemented as computer-executable instructions stored in memory of the devices for execution by the devices.

16. The system of claim 15 wherein the offering includes offering multiple security suites to secure the outbound connection.

17. The system of claim 15 wherein a security suite includes an integrity algorithm, an encryption algorithm, and an authentication algorithm.

18. The system of claim 17 including receiving an indication of whether the outbound security policy is to provide integrity checking or integrity checking and encryption.

19. The system of claim 15 wherein the security policy is based on the IP security protocol.

20. The system of claim 15 wherein the outbound security policy allows all outbound connections that can be secured.

* * * * *

UNITED STATES PATENT AND TRADEMARK OFFICE
CERTIFICATE OF CORRECTION

PATENT NO.       : 7,581,241 B2                                          Page 1 of 1
APPLICATION NO. : 11/182720
DATED            : August 25, 2009
INVENTOR(S)      : Bassett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1075 days.

Signed and Sealed this

Fourteenth Day of September, 2010

David J. Kappos
*Director of the United States Patent and Trademark Office*